(12) United States Patent
Jones et al.

(10) Patent No.: US 7,010,300 B1
(45) Date of Patent: Mar. 7, 2006

(54) METHOD AND SYSTEM FOR INTERSYSTEM WIRELESS COMMUNICATIONS SESSION HAND-OFF

(75) Inventors: Bryce A. Jones, Overland Park, KS (US); Jason Delker, Olathe, KS (US); Von K. McConnell, Leawood, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 510 days.

(21) Appl. No.: 10/161,313

(22) Filed: Jun. 3, 2002

Related U.S. Application Data

(63) Continuation-in-part of application No. 09/595,595, filed on Jun. 15, 2000.

(51) Int. Cl.
*H04Q 7/20* (2006.01)
(52) U.S. Cl. ................................. 455/439; 455/437
(58) Field of Classification Search ................. 455/439
See application file for complete search history.

(56) References Cited

U.S. PATENT DOCUMENTS

| | | | |
|---|---|---|---|
| 5,737,703 A | 4/1998 | Byrne | |
| 5,771,275 A * | 6/1998 | Brunner et al. | 455/436 |
| 5,890,064 A | 3/1999 | Widergen et al. | |
| 5,970,059 A * | 10/1999 | Ahopelto et al. | 370/338 |
| 6,243,581 B1 | 6/2001 | Jawanda | |
| 6,377,804 B1 * | 4/2002 | Lintulampi | 455/435.2 |
| 6,434,134 B1 * | 8/2002 | La Porta et al. | 370/338 |
| 6,434,156 B1 * | 8/2002 | Yeh | 370/401 |
| 6,438,117 B1 | 8/2002 | Grilli et al. | |
| 6,473,411 B1 * | 10/2002 | Kumaki et al. | 455/436 |
| 6,560,459 B1 * | 5/2003 | Wong | 455/447 |
| 6,584,098 B1 * | 6/2003 | Dutnall | 370/354 |
| 6,600,734 B1 | 7/2003 | Gernert et al. | 370/352 |
| 6,650,899 B1 * | 11/2003 | Stumpert | 455/436 |
| 6,658,259 B1 | 12/2003 | McIntosh | 455/462 |
| 6,680,923 B1 | 1/2004 | Leon | |
| 6,721,306 B1 * | 4/2004 | Farris et al. | 370/352 |
| 6,771,964 B1 * | 8/2004 | Einola et al. | 455/437 |
| 6,782,266 B1 | 8/2004 | Baer et al. | 455/456.4 |
| 6,879,600 B1 * | 4/2005 | Jones et al. | 370/466 |
| 2001/0036830 A1 | 11/2001 | Wu et al. | |
| 2002/0065079 A1 * | 5/2002 | Ekman et al. | 455/439 |
| 2002/0067707 A1 * | 6/2002 | Morales et al. | 455/436 |

(Continued)

OTHER PUBLICATIONS

"The Link Wireless Telephone System versus Licensed Wireless Office Services AG Communication systems ROAMEO Ericsson Mobile Advantage", Jan. 2001, pp. 1-3.

(Continued)

*Primary Examiner*—Rafael Perez-Gutierrez
*Assistant Examiner*—M. Santiago-Cordero

(57) ABSTRACT

A method of handing off an ongoing wireless telecommunication session with a mobile station when the mobile station is engaging in the ongoing communication session via a first access system, and then registers in a second access system, is provided. When communicating with the first access system the mobile station communicates with a first access node according to a first protocol. When communicating with the second access system the mobile station communicates with a second access node according to a second protocol, which is a different protocol than the first protocol. After registration of the mobile station in the second access system, the ongoing communication session is carried between the mobile station and the second access node according to the second protocol over the first protocol. More specifically, the ongoing communication session is carried between the mobile station and the second access node using the first protocol encapsulated in the headers of the second protocol.

21 Claims, 9 Drawing Sheets

U.S. PATENT DOCUMENTS

| | | | |
|---|---|---|---|
| 2002/0163938 A1* | 11/2002 | Tuomainen et al. | 370/468 |
| 2002/0197992 A1* | 12/2002 | Nizri et al. | 455/435 |
| 2003/0081565 A1 | 5/2003 | McIntosh et al. | 370/328 |
| 2003/0091021 A1 | 5/2003 | Trossen et al. | |
| 2003/0108007 A1* | 6/2003 | Holcman et al. | 455/439 |
| 2003/0114158 A1* | 6/2003 | Soderbacka et al. | 455/436 |
| 2003/0193911 A1* | 10/2003 | Zhao et al. | 455/436 |
| 2004/0068571 A1* | 4/2004 | Ahmavaara | 709/228 |
| 2004/0203791 A1 | 10/2004 | Pan et al. | 455/442 |

OTHER PUBLICATIONS

Chan, C. Mun, Woo, Y.C, "Next-Generation Wireless Data Services: Architecture and Experience", IEEE Personal Communications, Feb. 1999, pp. 20-33.

"Nortel Networks: Products, Services & Solutions-Meridian 1- Tech Specs", Meridi pp. 1-8, printed from the Worldwide Web on Jan. 15, 2002.

Greene N., Ramalho M., Rosen B., "*Media Gateway Control Protocol Architecture and Requirements*", http://www.ietf.org/rfc/rfc2805.txt, Apr. 2000, pp. 1-46.

"*Meridian Internet Telephony Gateway (ITG) Line 2.0*", Nortel Networks, Apr. 2000, pp. 1-2.

Carpenter R. Jerry, Stima J. Michael, "*New Wireless Business Communications Directions*", Bell Labs Technical Journal, 1996, pp. 165-171.

"*Evolution without Discontinuity*", Nortel Networks pp. 1-4, printed from the Worldwide Web on Jan. 15, 2002.

"*The Perfect Fit for any Size Communications need*", Meridian 1 System Specifications, Nortel Networks, Sep. 1999.

"*IP-PBX Management: Piecing it All Together*", Voice2000, Feb. 2000, http://www.bcr.com/voice2000/v3n1/p08.asp, pp. 8-15.

"IP Mobility Support", Network Working Group, Oct. 1996, pp. 1-79.

* cited by examiner

METHOD AND SYSTEM FOR INTERSYSTEM WIRELESS COMMUNICATIONS SESSION HAND-OFF

RELATED APPLICATIONS

The present application is related to Non-provisional application Ser. No. 09/595,595, filed Jun. 15, 2000, titled "Private Wireless Network Integrated with Public Wireless Network," which is assigned to the same assignee as the present application. The present application is also a Continuation in Part (CIP) from the Non-provisional application Ser. No. 09/595,595, filed Jun. 15, 2000, titled "Private Wireless Network Integrated with Public Wireless Network."

BACKGROUND OF THE INVENTION

1. Field of the Invention

The present invention relates in general to telecommunications networks, and more particularly, to handing off communications from a mobile station operating in one access system to the mobile station operating in another access system. This invention is particularly useful for handing off ongoing communication sessions from a mobile station operating in a public wireless network to the same mobile station operating in a private wireless system, after the mobile station registers in the private wireless network. This invention, however, is also particularly useful for handing off an ongoing communication session from a mobile station operating in a private wireless system to the same mobile station operating in the public wireless network, after registering the public wireless network.

2. Description of Related Art

Public wireless telecommunication networks have been developed using a model that is similar to traditional wireline telecommunication networks. Traditional wireline Telecommunications networks typically carry "signals," as well as the voice or data comprising the conversation between the calling party and the called party. These signals monitor the status of the lines, indicate the arrival of incoming calls, and carry the information needed to route the voice or other data through the network. At one time, these signals were inband, i.e., the signals were transmitted through the same circuits as used for voice transmission. However, most circuit-switched telecommunications networks now use out-of-band signaling, i.e., the signals are transmitted over a signaling network separate from the circuit-switched network that carries voice and data. Thus, signals carried on the separate signaling network are used to control the switches in the circuit-switched network to set up and tear down the circuit between the calling party and called party.

In a typical public wireless networks, switching is performed by one or more mobile switching centers (MSCs). Each MSC typically controls one or more base stations or base transceiver stations (BTSs), sometimes via one or more base station controllers (BSCs). Each BTS provides a wireless coverage area within which mobile stations can communicate with the BTS over an air interface. The mobile stations can be cellular or PCS telephones, personal digital assistants (PDAs), and/or other devices. Different formats may be used for communicating over this wireless interface. At present, the most commonly used formats in the United States are Advanced Mobile Phone Service (AMPS), Time Division Multiple Access (TDMA), Global System for Mobile Communications (GSM), and Code Division Multiple Access (CDMA).

In addition to public wireline and wireless networks, businesses and other organizations (collectively referred to herein as "enterprises") have been using private telecommunications networks for many years. Such networks are "private" in that the networks' coverage areas are more geographically limited, and typically, but not necessarily, subscription to the networks is limited to a select group of subscribers. For example, many enterprises have used private wireline switching systems, such as private branch exchanges (PBXs), to switch calls to and from telephones in the enterprise's office area. Such private telecommunications networks advantageously allow an enterprise greater control over its telecommunications system and enable the enterprise to customize the telecommunications it provides to its subscribers.

More recently, private telecommunications networks have also been provided with wireless capability. In particular, there have been developed various wireless office telephone systems ("WOTS") that provide for wireless communication in a, typically, limited geographic area, such as a building or campus. See, e.g., Lawrence Hart, et al., "Cellular and PCS: The Big Picture," p. 183–232 (1997). However, many such WOTS systems require specialized telephones, so that a standard cellular or PCS telephone that can be used in a public wireless network may not work in a given WOTS system. With many people routinely carrying a cellular or PCS telephone, requiring a different telephone to be used at work is a substantial inconvenience.

To overcome this disadvantage, some wireless office systems have been developed in accordance with the TIA's IS-94 specifications. The IS-94 specifications allow the same mobile stations to be used in both private and public wireless networks. However, IS-94 is not designed to hand-off calls between the private and public wireless networks. The lack of hand-off capability is a significant drawback. In particular, if a user moves out of the limited coverage area of the wireless office system during the course of a call, the call may be dropped. Alternatively, if the user during the course of a communication session moves into the coverage area of the private wireless network and a hand-off is not effectuated, the public wireless network may not realize savings of network resources that may have occurred had the communication session been handed-off.

In addition to the WOTS systems, recent advances in telecommunication services served over local area network, such as Voice-over-Packet-Data network communications, have provided the impetus for delivering wireless telecommunication services over local area networks. Accordingly, support for wireless telecommunications services over local area networks is approaching near necessity for many enterprises. And the need for such services is rapidly growing, not just for enterprises, but also for individuals for personal and business use in the home or home office, respectively. This need may be satisfied by a wireless local area network based on the Bluetooth specification, which is designed to serve telecommunication services to mobile stations operating within its coverage area. The Bluetooth specification provides that Bluetooth technology devices, such as PDAs and/or cell telephones, may quickly and reliably exchange data with other Bluetooth technology devices, as well as provide local wireless connectivity with the wireless local area network element, such as desktop and docked notebook computers. Like the WOTS specification, the Bluetooth specification is not designed to hand-off communications between public and private wireless networks.

Even more recently, the IEEE promulgated the IEEE 802.11 standards to define the communication protocols between mobile stations, and network access points that bridge mobile stations to a local area network. One major advantage of using a wireless local area network that conforms to the IEEE 802.11 standard is the ability to use freely-available, unlicensed spectrum, including the Industrial, Scientific, and Medical (ISM) band. Another advantage provided by the 802.11 standard is the specified support for the 1-Mps, 2-Mps, and the recently added 5.5-Mps and 11-Mps transmission speeds. In the near future, the IEEE standard may support transmission speeds of 36-Mps, 48-Mps, 54-Mps, and 108 Mps. While the IEEE 802.11 standard loosely defined a portal or bridge function, the portal or bridge function indicates how to perform a hand-off of an ongoing communication session engaged in by a mobile station in a local area network.

Some wireless office systems, however, have some limited ability to allow users to move between the private and public cellular networks during the course of an ongoing communication session. An example is the ROAMEO in-building wireless telephone system that is sold by AG Communication Systems, headquartered in Phoenix, Ariz. The ROAMEO system is provided as an adjunct to a company's existing PBX, Centrex, or key system and allows standard wireless telephones to act as wireless extensions of the existing office desktop telephones. If a user originates a communication session in the public wireless network, and then moves into the building served by the ROAMEO system during the course of the communication session, the session will continue using the public wireless network provided that the signal from the public wireless network is able to penetrate into the building. Moreover, once the communication session is ended, the telephone is automatically registered on the ROAMEO system. However, if a communication session is originated within the coverage area of the ROAMEO system, it may be dropped if the telephone leaves the ROAMEO coverage area.

Widergen, et al., U.S. Pat. No. 5,890,064 discloses a wireless office system that is said to be integrated into both a private telephony network and a public cellular system. Certain of the disclosed embodiments are said to support handover of ongoing communication session between cells of the wireless office system and the public cellular system. Analogous to the public wireless network, Widergen's wireless office system includes a wireless office gateway, and a radio access network to provide wireless communications to corporate mobile terminal, which is part of a corporate group of terminals of the private telephony network.

A disadvantage with this configuration, however, is that the wireless office system "is implemented as a private wireless system that operates according to the same standard as the public cellular system." See Widergen, et al., In.1 col. 4. While such a system allows the subscriber to use the same mobile station in both the public wireless system and the wireless office system, it may be advantageous for subscribers to have one or more mobile stations that use different standards. Differing standards may take advantage of different range and power capacities for both the mobile station and subscribing networks, which may reduce or eliminate waste of network resources, and prevent over design of both types of networks. Widergen's technique of using the public wireless network elements to control the transmission of communication services in both the public and private wireless network does not facilitate application of different standards, either using a single mobile station or multiple stations.

SUMMARY OF THE INVENTION

A first aspect of the present invention is directed to a method and system for handing off an ongoing communication session engaged in by a mobile station via a first access system, to the mobile station via a second access system. Both the first access system and the second access system, which are located downstream from the common transport network, include an access node, namely, the first access node and the second access node, respectively. Each of the access nodes provides access for the mobile station to communicate with a common transport network. The common transport network is where incoming portions of the ongoing communication session destined to the mobile station emanate from, and where outgoing portions of the ongoing communication session from the mobile station flow to.

While registered and operating within the coverage area of the access systems, the mobile station may be served telecommunication services via the access nodes. For instance, when registered and operating in the first access system, the mobile station communicates over a wireless interface with the first access system via the first access node. And, when registered and operating in the second access system, the mobile station communicates over the wireless interface with the second access system via the second access node.

When communicating with the first access node, the mobile station communicates according to a first protocol. The mobile station, however, communicates with the second access node according to a second protocol, which is a different protocol than the first protocol. To facilitate handing-off of the ongoing communication session with the mobile station via the first access system, to the mobile station via the second access system, the preferred protocol used to communicate between the mobile station and the second access node is the second protocol over the first protocol. When handing-off an ongoing communication session via the second access system to the mobile station in the first access system, the protocols that the mobile station uses for communicating with the respective wireless access points remains the same.

The second protocol over the first protocol may be provided by encapsulating the incoming and outgoing portions of the communication session, which are in accordance with the first protocol, in headers of the second protocol. Encapsulating the incoming and outgoing portions of the ongoing communication session in headers of the second protocol may include encapsulating with headers and optionally with footers, if the second protocol defines both. The second protocol may define a second protocol package that has a header, footer, and payload. It is in this payload that the incoming and outgoing portions of the ongoing communications session are held. In other words, encapsulating the incoming and outgoing portions of the ongoing communication session includes placing or embedding the incoming and outgoing portions in the payload of one or more second protocol packages.

Communicatively coupled to both the first access system and the second access system, and between the common transport network, is a common gateway. Thus, the incoming and outgoing portions of ongoing communication sessions pass through the common gateway. And, depending on where the mobile station is operating, the common gateway may direct the ongoing communication sessions to the mobile station via either the first access system or the second access system.

For the ongoing communication session to be handed-off, the incoming and outgoing portions of the communication session that pass through the common gateway to either the first access system or the second access system may undergo one or more protocol translations. If the communication session is to undergo a protocol translation, preferably, the common gateway performs the protocol translation. The protocol translation, however, may be performed by other elements upstream, i.e. in between, from the access nodes in either access system, including elements in the common transport network, the first access system, and/or the second access system.

In addition to providing translation, the common gateway may facilitate communication session hand-offs for ongoing communication sessions engaged in by the mobile station via either the first access system, or the second access system by re-routing of the incoming and outgoing portions of the communication session from the first access system to the second access system, and vice-versa.

A second aspect of the present invention is directed to a method and system for communication session handoff between a mobile station via a public wireless network to the mobile station via a wireless local area network (WLAN), after the mobile station registers with the WLAN. The public wireless network is preferably a CDMA network, such as the Sprint PCS network, but may be any public wireless network covering a wide ranging, geographic area that any interested party of the general public may subscribe. Such other networks typically include AMPS, TDMA or GSM networks. The WLAN, on the other hand, is more limited in geographic coverage area and typically, but not necessarily, limits subscription to a select number of subscribers. Preferably, the private WLAN conforms to the IEEE 802.11 protocol; however, the WLAN may conform to other protocols.

In a typical arrangement of the public wireless network, a mobile station communicates over a wireless interface with a base transceiver station (BTS). The BTS is communicatively coupled with a base station controller (BSC), which in turn is communicatively coupled with a mobile switching center (MSC), a packet data serving node (PDSN), and/or a gateway.

The MSC and/or gateway may provide connectivity between the mobile station and a transport network, such as a public switched telephone network (PSTN); whereas the PSDN and/or gateway provides connectivity to an alternative transport network, such as a packet data network (PDN), which may include the Internet.

When operating in the public wireless network, during an ongoing communication session occurring between the mobile station, and either the PSTN or PDN, the incoming portion of an ongoing communication session may be routed to the BSC via the MSC, PDSN, and/or gateway. The BSC then relays the incoming portion of the ongoing communication session to the BTS for transmission to the mobile station. In the outgoing portion of the ongoing communication session, the mobile station transmits the outgoing portion to the BTS via the wireless interface. The outgoing portion of the ongoing communication session is then relayed by the BSC to the MSC, PDSN, and/or gateway, which is then transported to either the PSTN or PDN.

The private wireless network (embodied as an IEEE 802.11 wireless local area network) includes various interconnected elements. Included amongst these elements is a wireless access point interconnected with a wireless local area network server (WLAN server). The WLAN server, in turn, may be communicatively coupled with the transport network.

When operating within the WLAN's coverage area, during an ongoing communication session occurring between the mobile station and the transport network, the incoming portion of the ongoing communication session may be routed to the WLAN server. Thereafter, the WLAN server sends the incoming portion of the ongoing communication session to the wireless access point. The wireless access point then transmits the incoming portion of the ongoing communication session to the mobile station.

For the outgoing portion of the ongoing communication session, the mobile station transmits the outgoing portion to the wireless access point via the wireless interface. The outgoing portion of the ongoing communication session is then relayed by the wireless access point to the WLAN server. The WLAN server sends the outgoing portion of the ongoing communication session to the transport network.

Also included in this second aspect is a gateway communicatively coupled to the transport network. This gateway may be integral to integrated into the public wireless network and/or the WLAN. The gateway, however, may stand apart from either the public wireless network or WLAN. The gateway provides a protocol encapsulation/unencapsulation function for facilitating a hand-off of an ongoing communication session engaged in by the mobile station via the public wireless network or via the private wireless network. The gateway may also provide an encoding function to encode and decode data of the ongoing communication session. Additionally, gateway may include switching functionality for routing the ongoing communication session to the mobile station via the public wireless network to the mobile station via the private wireless network (and vice versa).

As noted above, the public wireless network preferably conforms to the CDMA wireless telecommunication standard, and the preferred format of the WLAN is IEEE 802.11. The public wireless network may conform to AMPS, GSM, TDMA, and/or other format. In addition to IEEE 802.11 WLAN standard, the private wireless network may use the same formats as the public wireless network, and/or other formats. Consequently, when communicating in the public wireless network, the mobile station communicates with the BTS using the protocol of the public wireless network, which in a CDMA network is preferably the Enhanced Variable Rate Coder (EVRC) standard. And when communicating in the private wireless network, the mobile station communicates with the wireless access point according to the protocol of the private wireless network, which in an 802.11 WLAN is preferably the 802.11 standard.

Notably, the format for communicating with the BTS in the public wireless network is the EVRC standard, and the format for communicating with the wireless access point is the 802.11 protocol, which is a different protocol than the EVRC standard. To facilitate a hand-off an ongoing communication session engaged in by the mobile station via the public wireless network to the mobile station in the WLAN, the ongoing communication session may be conveyed using the private wireless network standard over the public wireless network standard. For a hand-off of an ongoing communication session via the private wireless system to the mobile station in the public wireless network, the ongoing communication may be conveyed using the public wireless network protocol. Before hand-off to the mobile station via the public wireless network, however, the ongoing communication session in the private wireless system may be conveyed using the private wireless network protocol over the public wireless network protocol.

Communicating the ongoing communication session according to the private wireless network protocol over the public wireless network protocol may include encapsulating the public wireless network protocol in headers of the private wireless network protocol. By way of example, for a hand-off of an ongoing communication session engaged in via a CDMA public network to the mobile station via the WLAN, the ongoing communication session may be comprised of EVRC data encapsulated in IEEE 802.11 frames to produce 802.11-framed-EVRC data. The mobile station and the wireless access point exchange the 802.11-framed-EVRC data to continue the ongoing communication session, after the mobile station registers in the WLAN.

An advantage of using such format is the ability to reduce the complexity of the mobile station. For instance, the mobile station may contain at least two communication modes for handing off ongoing communication sessions. In one of the communication modes, the mobile station operates according to the public wireless network protocol. In another of the communication modes, the mobile station operates according to the WLAN. In each of these modes, the mobile station may require separate components to carry on a communication session. However, by using another communication mode, namely the private wireless network protocol over the public wireless network protocol mode, the mobile station may still operate in the private wireless network. This mode also allows the mobile station to advantageously use the same encoder/decoder (vocoder) in the public wireless network and the private wireless network, which may reduce the mobile station's complexity, and numbers of components.

In addition reducing the complexity of the mobile station, the present invention can conveniently take advantage of the higher data rates, the lower cost, and the superior building coverage of IEEE 802.11 wireless local area networks (WLAN), as compared with CDMA and other public wireless networks. For instance, the invention can obviate the need for CDMA radio equipment in buildings, and other campus areas. Further, the lower cost may be realized by utilizing the WLAN configuration as a result of no license fees or license auctions necessary for utilizing the frequency spectrum represented by the 802.11 implementation. Alternately, the public wireless network and the private wireless network may be co-located, integral to, and/or integrated into the same equipment enabling subscribers to benefit from reduced service costs, reduced capital equipment costs resulting from subscribing/leasing rather than owning, and eliminating or reducing the cost of obsolescence.

These as well as other aspects and advantages will become apparent to those of ordinary skill in the art by reading the following detailed description with appropriate reference to the accompanying drawings.

BRIEF DESCRIPTION OF THE DRAWINGS

Presently preferred embodiments of the invention are described below in conjunction with the appended figures, wherein like reference numerals refer to like elements in the various figures, and wherein.

DETAILED DESCRIPTION OF AN EXEMPLARY EMBODIMENT

As noted above, various aspects and advantages of an exemplary embodiment of the method and system for inter-system wireless communication session hand-off may become apparent by reading the following specification. With reference to the accompanying drawings, the following sections illustrate several of the various aspects and advantages.

1. First to Second Access System Hand-off

A. Exemplary Architecture of the Access Systems

Figure 1:
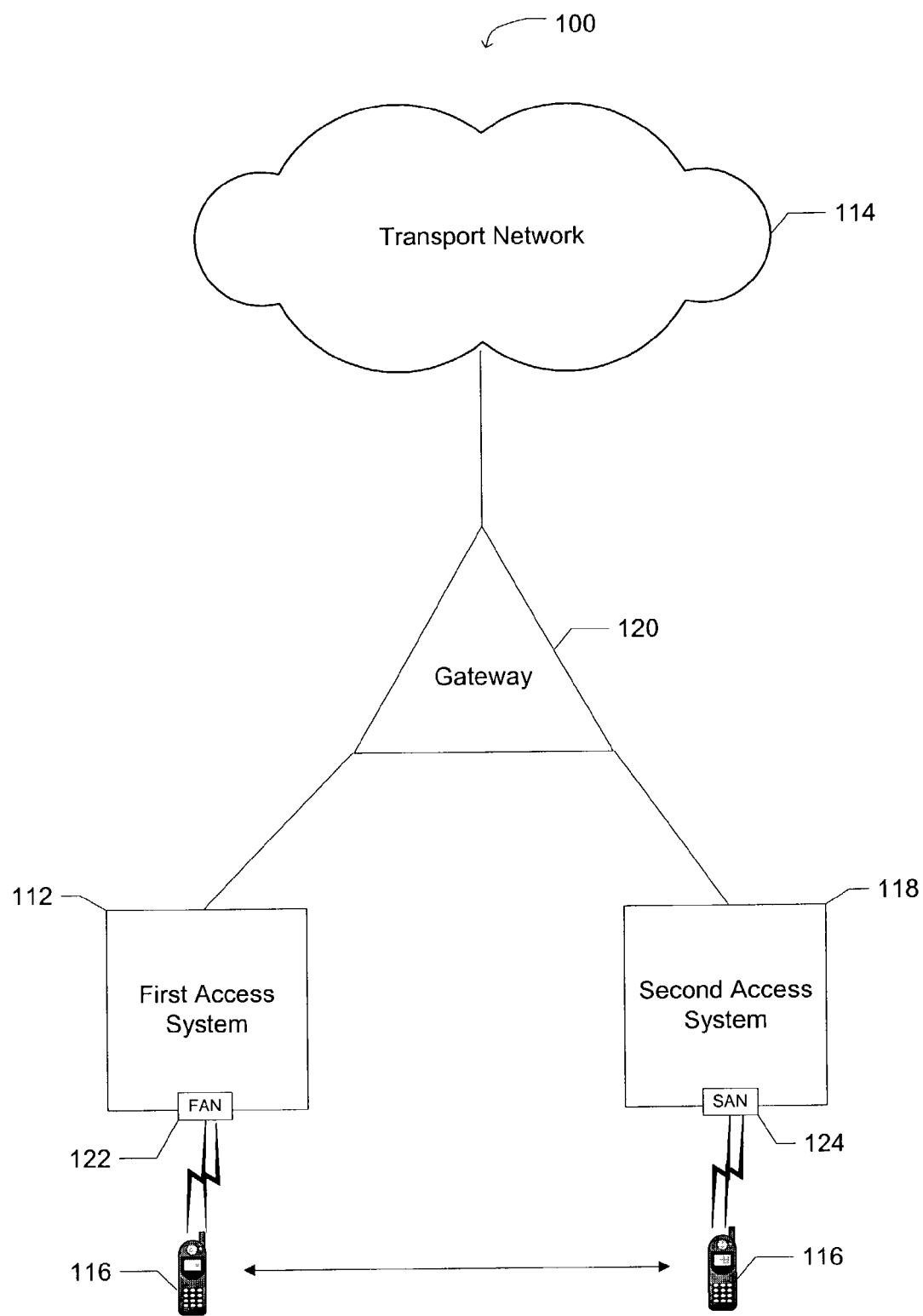
FIG. 1 is a block diagram depicting an arrangement for carrying out one of the preferred embodiments.

Referring to the drawings, FIG. 1 generally depicts an arrangement 100 for carrying out an exemplary embodiment of the invention. As shown in FIG. 1, a first access system 112 is located downstream from a common transport network 114. The first access system 112 provides a first communication path for communications exchanged between the common transport network 114, and a mobile station 116 when the mobile station 116 is operating in the first access system 112. Included in the first access system is a first access node 122. When registered and operating in the first access system 112, one segment of the first communication path is provided by a wireless interface over which the mobile station 116 communicates with first access system 112 via the first access node 122. The first access system 112 may also include various interconnected network elements that provide additional segments of the first communication path between the first access node 122, and the common transport network 114.

FIG. 1 also shows a second access system 118 that is located downstream from the common transport network 114. The second access system 118 provides a second communication path to the common transport network 114 for communications exchanged between the common transport network 114 and mobile station 116. Paralleling the first access system 112, the second access system 118 likewise includes a second access node 124. When registered with the second access system 118, one segment of the second communication path is provided by the wireless interface over which the mobile station 116 communicates with the second access system 118 via the second access node 124. The second access system 118 may also include various interconnected network elements that provide additional segments of the communication path between the second access node 124, and the common transport network 114.

Both the first access system 112 and the second access system 118 are communicatively coupled or otherwise connected to a common gateway 120, as shown in FIG. 1. The common gateway 120 in turn is coupled or otherwise connected to the common transport network 114. Thus, communications exchanged between the common transport network 114 and the mobile station 116 pass through the common gateway 120. And, depending on where the mobile station 116 is operating, the communications pass through either first access system 112 or second access system 118.

B. Communication Session Parts, Format, and Flow through the Access Systems

A communication session engaged in by the mobile station 116 via either the first access system 112 or via the second access system 118 may include a downstream part and an upstream part. The downstream part includes portions of the communication session emanating from the common transport network 114 and destined for the mobile station 116. Preferably included in the downstream part is incoming data, including voice data that is destined for the mobile station 116.

The incoming data destined for the mobile station 116, may take various forms as it travels from the common transport network 116 to the mobile station 114, via the first or second access system and the common gateway 120. For instance, when the first access system 112 communicates the incoming data to the mobile station 116 over the wireless interface via the first access node 122, it sends the incoming data of the communication session formatted as "incoming first-protocol data." What this means is that the incoming data is packaged according to a first protocol.

Analogously, when the second access system 118 communicates the incoming data to the mobile station 116 over the wireless interface via the second access node 124, it sends the incoming data to the mobile station 116 formatted as "incoming second-protocol data." And, in this case, the incoming data is packaged according to a second protocol.

The upstream part of the communication session includes portions of the communication session emanating from the mobile station 116, and destined for transport into the common transport network 114. Preferably included in the portions of the communication of the upstream part is outgoing data, which generally includes voice data. The outgoing data destined for the common transport network 114, may take various forms as it travels from the mobile station 116 to the common transport network 114 via the first or second access system and the common gateway 120.

Analogous to the downstream part, when the mobile station 116 communicates the outgoing data to the first access system 112 over the wireless interface, it sends to the first access node 122 the outgoing data formatted as "outgoing first-protocol data." The outgoing first-protocol data comprises outgoing data packaged according to the first protocol. Similarly, when the mobile station 116 sends the second access system 118 the outgoing data, it sends the outgoing data over the wireless interface formatted as "outgoing second-protocol data," wherein the outgoing second protocol data is packaged according to the second protocol.

In a communication session engaged in by the mobile station 116 via the common gateway 120, the incoming data of the communication session that passes through the common gateway 120 to the first access system 112 or to the second access system 118 may undergo a protocol translation. In a similar fashion, outgoing data of a communication session that passes through the common gateway 120 from the mobile station 116 for transport into the common transport network 114 may also undergo a protocol translation. If the communication session is to undergo a protocol translation, preferably, the common gateway 120 performs the protocol translation. The protocol translation, however, may be performed by other elements upstream from the wireless interface in either the first or second access system, including elements in the common transport network 114, the first access system 112, and/or the second access system 118.

If, for example, the mobile station 116 is engaged in a communication session via the first access system 112, and the common gateway 120 receives incoming first-protocol data of the communication session, the common gateway 120 may simply pass (or route) the incoming first-protocol data to the first access system 112. On the other hand, if the common gateway 120 receives incoming data of the communication session that does not conform to the first protocol, it may translate the incoming data according to the first protocol to yield incoming first-protocol data. After the translation, the common gateway 120 may then route the incoming first-protocol data of the communication session to the first access system 112 for transmission to the mobile station 116.

For outgoing first-protocol data of the communication session received from the first access system 112, the common gateway 120 may translate it, if necessary, according to an appropriate protocol for transmission into the common transport network 114 or other upstream element (not shown). After translation, if any, the common gateway 120 may then route the translated or un-translated outgoing first-protocol data to the common transport network 114 or other upstream element.

Similarly, if the mobile station 116 is engaged in a communication session via the second access system 118, and the common gateway 120 receives incoming second-protocol data, the common gateway 120 may simply pass (or route) the incoming second-protocol data of the communication session to the second access system 118 un-translated. Alternately, if the common gateway 120 receives incoming data of the communication session that does not conform to the second protocol, the common gateway 120 may translate the incoming data according to the second protocol to yield incoming second-protocol data. Once translated, the common gateway may route the incoming second-protocol data of the communication session to the second access system 118 for transmission to the mobile station 116.

When the common gateway 120 receives outgoing second-protocol data that is destined for an upstream recipient, and the outgoing second-protocol data conforms to the same protocol for transport to the upstream destination, the common gateway 120 may simply relay the outgoing second-protocol data to the transport network 114. When the common gateway 120 receives outgoing second-protocol data of the communication session from the second access system 118 that does not conform to an appropriate protocol for transmission to the common transport network 114, the common gateway 120 may translate the outgoing second-protocol data according to the appropriate protocol, as needed. After translation, the common gateway 120 may then route the translated outgoing second-protocol data to the common transport network 114 or other upstream element.

In addition to providing translation, the common gateway 120 may facilitate communication session hand-offs for ongoing communication sessions engaged in by the mobile station 116 via either the first access system 112, or the second access system 118. For instance, in an ongoing communication session via the first access system 112, the common gateway 120 preferably operates as follows. Prior to handing off, the common gateway 120 passes incoming first-protocol data to the first access system 112 for the downstream part of the ongoing communication session. In the upstream part of the ongoing communication session, outgoing data from the mobile station 116 may be passed by the common gateway 120 to the common transport network 114 either translated or un-translated, depending on the communication session protocol upstream from the common gateway 120. When instructed to hand-off the ongoing communication session, the common gateway 120 switches from routing the incoming first-protocol data to the first access system 112 to routing the incoming first-protocol data to the second access system 118, translating as needed. After receiving outgoing second-protocol data of the ongoing (and continued) communication session from the mobile station 116 via second access system 118, the common gateway 120 routes the outgoing second protocol data into the common transport network 114, again, translating as needed.

As noted by way of an example, when the mobile station 116 is engaging in an ongoing communication session via the first access system 112, the mobile station 116 communicates with the first access system according to a particular protocol, namely the first protocol. When the mobile station 116 registers with the second access system 118 during the ongoing communication session via the first access system 112, the mobile station 116 may benefit from handing off the communication session to the mobile station 116 operating in the second access system 118. The mobile station 116 and the second access system 118, however, communicate using a second protocol, which in a preferred embodiment is a different protocol than the first protocol.

Given that the mobile station 116 communicates with the second access system 118 according to the second protocol, ideally, after the hand-off, the mobile station 116 continues the communication session via the second access system 118 according to the second protocol over the first protocol. In other words, the incoming data in the downstream part communicated to the mobile station 116 from the second access system 118 as incoming second-protocol data preferably comprises incoming second-protocol encapsulated incoming first-protocol data (or more simply, "incoming second-protocol encapsulated first-protocol data"). For the upstream part of the communication session, the outgoing data communicated from the mobile station 116 to the second access system 118 as outgoing second-protocol data preferably comprises outgoing second-protocol encapsulated outgoing first-protocol data (or just, "outgoing second-protocol encapsulated first-protocol data").

The mobile station 116 may create outgoing second-protocol encapsulated first-protocol data by encapsulating or concatenating the outgoing first-protocol data in headers of the second protocol. The headers of the second protocol may include both headers and footers, if the second protocol defines both. The second protocol may define a second protocol package that has a header, footer, and payload in which the payload includes the data being communicated. In this case, the payload preferably includes the first-protocol data. Therefore, to encapsulate the outgoing first-protocol-encoded data in headers of the second protocol, the mobile station 116 may place or embed the outgoing first-protocol-encoded data in the payload of one or more second protocol packages to produce outgoing second-protocol encapsulated first-protocol data.

Additionally, the outgoing first-protocol data may itself incorporate encapsulated outgoing data in headers of the first protocol. So, the outgoing second-protocol encapsulated first-protocol data includes outgoing data encapsulated in the headers of the first protocol, which in turn is encapsulated within the headers of second protocol. On the other hand, the outgoing first-protocol data may include the outgoing data that, as opposed to being encapsulated, is encoded or otherwise converted into a transmission format according to the first protocol. Consequently, the outgoing second-protocol encapsulated first-protocol data includes outgoing data encoded in the first protocol, which is then encapsulated in headers of the second protocol.

C. Mobile Station's Modes

The mobile station 116 may contain at least two communication modes for handing off ongoing communication sessions. In one of the communication modes, the mobile station 116 operates according to the first protocol ("first-protocol mode"). In another of the communication modes, the mobile station 116 operates according to the second protocol ("second-protocol mode"). In still another communication mode, the mobile station 116 may operate in the second access network 118 using the second protocol over the first protocol ("second-over-first-protocol mode"). Other modes are possible, as well. Preferably, to hand-off an ongoing communication session engaged in via the first network to the mobile station 116 operating in the second access network, the mobile station 116 uses the first-protocol mode in the first access network 112, and the first-over-second-protocol mode in the second access network 118. In the second-over-first-protocol mode, the mobile station 116 may advantageously use a first-protocol encoder/decoder for communicating with both the first access system 112 and the second access system 118.

As an example, when an ongoing communication session engaged in by the mobile station 116 via the first access system 112 is handed-off to the mobile station 116 via the second access system 118, using its second-over-first-protocol mode, the mobile station 116 may strip the second protocol encapsulation from the incoming second-protocol encapsulated first-protocol data. Striping the second protocol encapsulation uncovers the incoming first-protocol data, which the mobile station 116 may then decode. Preferably, after stripping the encapsulation, the mobile station uses the first-protocol encoder/decoder to decode the incoming first-protocol data to yield the incoming data of the communication session. Moreover, for outgoing data of the ongoing communication session, the mobile station 116 may encode outgoing data using the first protocol encoder/decoder to create outgoing first-protocol data. Then, for transmission to the second access system 118, the mobile station 116 encapsulates the outgoing first-protocol data into one or more second protocol packages.

D. Functions for Accomplishing a First to a Second System Hand-off

Figure 2:
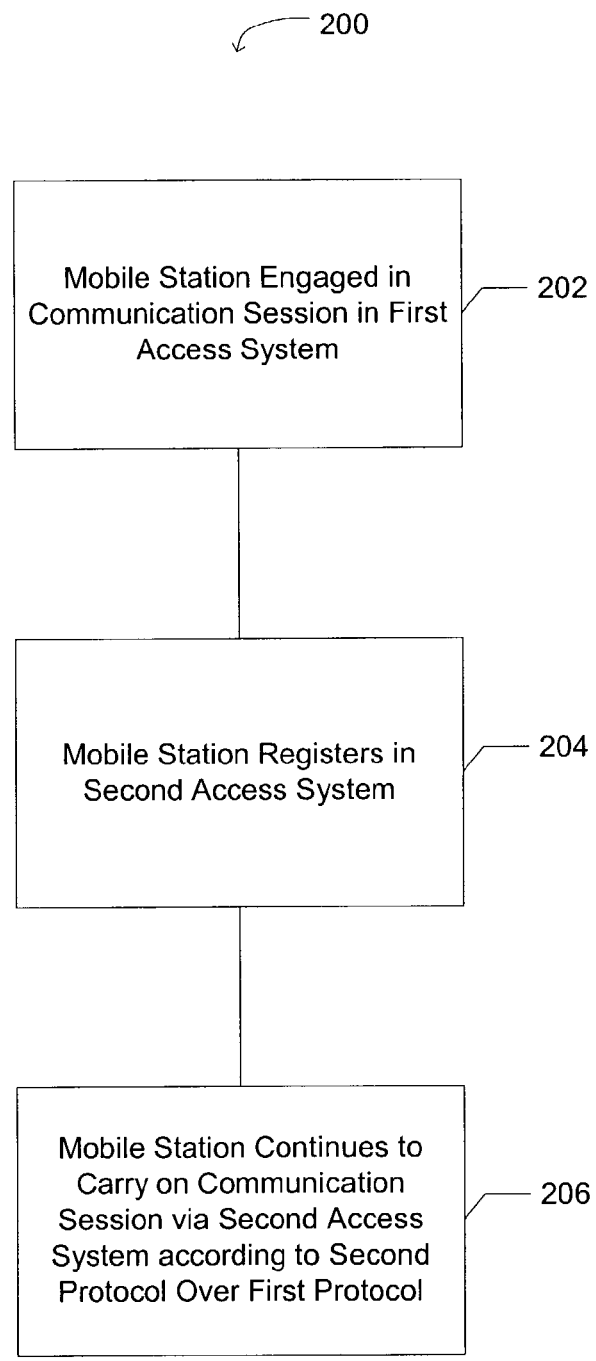
FIG. 2 is a first flow chart depicting functions that may be carried out in accordance with an exemplary embodiment.

Referring now to FIG. 2, a simplified flow chart 200 is provided depicting the functions used to accomplish a communication session hand-off in accordance with an exemplary embodiment. As shown in FIG. 2 and described with reference to FIG. 1, at block 202, a mobile station 116 is engaging in a communication session via a first access network 112. As part of the process of engaging in the communication session, the mobile station 116 sends outgoing data to the first access node 122 over an air interface according to a first protocol. Additionally, the mobile station 116 receives incoming data from the first access node 122 according to the first protocol.

At block 204, during the communication session that the mobile station 116 is engaging in via the first access system 112, the mobile station 116 registers in the second access system 118. After registering in the second access system 118, the mobile station 116 continues carrying on the communication session via the second access network 118, as shown in block 206. While the mobile station 116 continues to carry on the communication session, the mobile station 116 now engages in the communication session via the second access network 118 according to a second protocol, which preferably comprises the second protocol over the first protocol.

Figure 3:
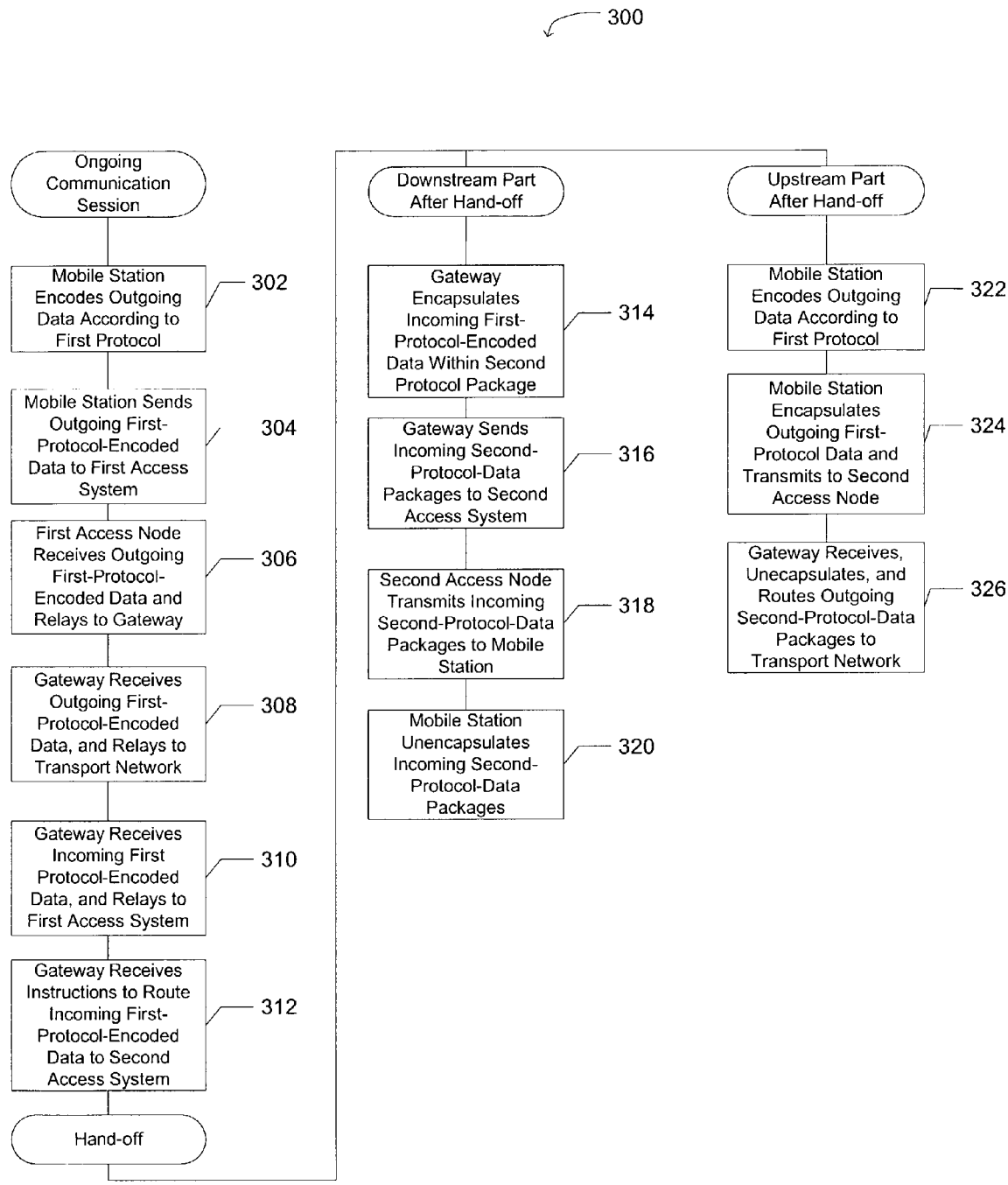
FIG. 3 is a second flow chart further illustrating the functions used to accomplish a communication session hand-off in accordance with an exemplary embodiment.

Referring next to FIG. 3, a more detailed flow chart is provided further illustrating the functions 300 used to accomplish a communication session hand-off in accordance with an exemplary embodiment. The exemplary embodiment illustrated in FIG. 3 is described with reference to FIG. 1, in which the communication session engaged in by the mobile station 116 via a first access system 112 is handed-off to the mobile station 116 via a second access system 118. As similarly illustrated in FIG. 2, the mobile station 116, as shown in FIG. 3, communicates with the first access system 112 according to a first protocol, and communicates with the second access system 118 according to the second protocol over the first protocol. It should be understood that the particular order of functions as set forth and described herein can vary from that presented.

Initially, the mobile station 116 engages in the communication session via the first access system 112 by encoding the outgoing data according to the first protocol to yield outgoing first-protocol-encoded data, as shown in block 302. The mobile station 116 then sends the outgoing first-protocol-encoded data to a first access node 122 for transmission to the common transport network 114, as per block 304.

At block 306, the first access node 122 receives the outgoing first-protocol-encoded data and relays the outgoing first-protocol-encoded data to the common gateway 120. Preferably, the common gateway 120 relays the outgoing first-protocol-encoded data into the common transport network 114 un-translated, at shown in block 308. The common gateway 120, however, may translate the outgoing first-protocol-encoded data before relaying the outgoing first-protocol-encoded data into the common transport network 114.

For the downstream part of the communication session, upon receiving incoming first-protocol-encoded data, the common gateway 120 simply relays the incoming first-protocol-encoded data to the first access system 112 for transmission to the mobile station 116, as shown in block 310. Alternatively, when the common gateway 120 receives incoming data not encoded according to the first protocol, it encodes the incoming data according to the first protocol before sending the incoming data to the first access system 112.

After the mobile station 116 registers with the second access network 118, at block 312, the common gateway 120 receives instructions to route the incoming first-protocol-encoded data of the communication session to the second access system 118 for transmission in turn to the mobile station 116. If, however, after the common gateway 120 receives instructions to route the incoming first-protocol-encoded data to the second access system 112, and the common gateway 120 receives incoming data of the communication session that is not in accord with the first protocol, then the common gateway 120 may encode the incoming data according to the first protocol, so as to produce incoming first-protocol-encoded data.

As shown in block 314, the common gateway 120 encapsulates the incoming first-protocol-encoded data in headers of the second protocol. Encapsulating the incoming first-protocol-encoded data in headers of the second protocol may include encapsulating the incoming first-protocol-encoded data with headers and footers, if the second protocol defines both. In other words, to encapsulate the incoming first-protocol-encoded data in headers of the second protocol, the common gateway 120 places or embeds the incoming first-protocol-encoded data in the payload of one or more second protocol packages to produce incoming second-protocol-data packages.

At block 316, the common gateway 120 sends the incoming second-protocol-data packages into the second access system 118. Upon arriving at the second access node 124, the incoming second-protocol-data packages are transmitted to the mobile station 116 over the wireless interface, as shown in block 318. After receiving the incoming second-protocol-data packages, at block 320, the mobile station 116 strips the headers of the second protocol from the incoming second-protocol-data packages to uncover the incoming first-protocol-encoded data. Then, using the first protocol encoder/decoder, the mobile station decodes the incoming first-protocol-encoded data to uncover or otherwise expose the incoming data.

At block 322, for the upstream part of the communication session after the registration in the second access system 118, the mobile station 116 encodes outgoing data according to the first protocol, preferably using the first protocol encoder/decoder. Encoding the outgoing data according to the first protocol produces outgoing first-protocol data. Thereafter, the mobile station 116 encapsulates the outgoing first-protocol data in headers of the second protocol, as illustrated in block 324. Preferably, the mobile station 116 encapsulates the outgoing first-protocol data by placing or embedding the outgoing first-protocol data in the payload one or more second protocol packages, thereby creating outgoing second-protocol-data packages. Once created, the mobile station 116 communicates the outgoing second-protocol-data packages to the second access node 124 for transmission to the common gateway 120.

After traveling through the second access system 118, the outgoing second-protocol-data package arrives at the common gateway 120. At block 326, the common gateway 120 receives the outgoing second protocol-data package and strips the headers of the second protocol for the outgoing second-protocol-data packages to uncover the outgoing first-protocol data. The common gateway 120 then routes the outgoing first-protocol data to the common transport network, which is also shown in block 326.

2. Public to Private Wireless Network Hand-off

A. Exemplary Architecture

Figure 4:
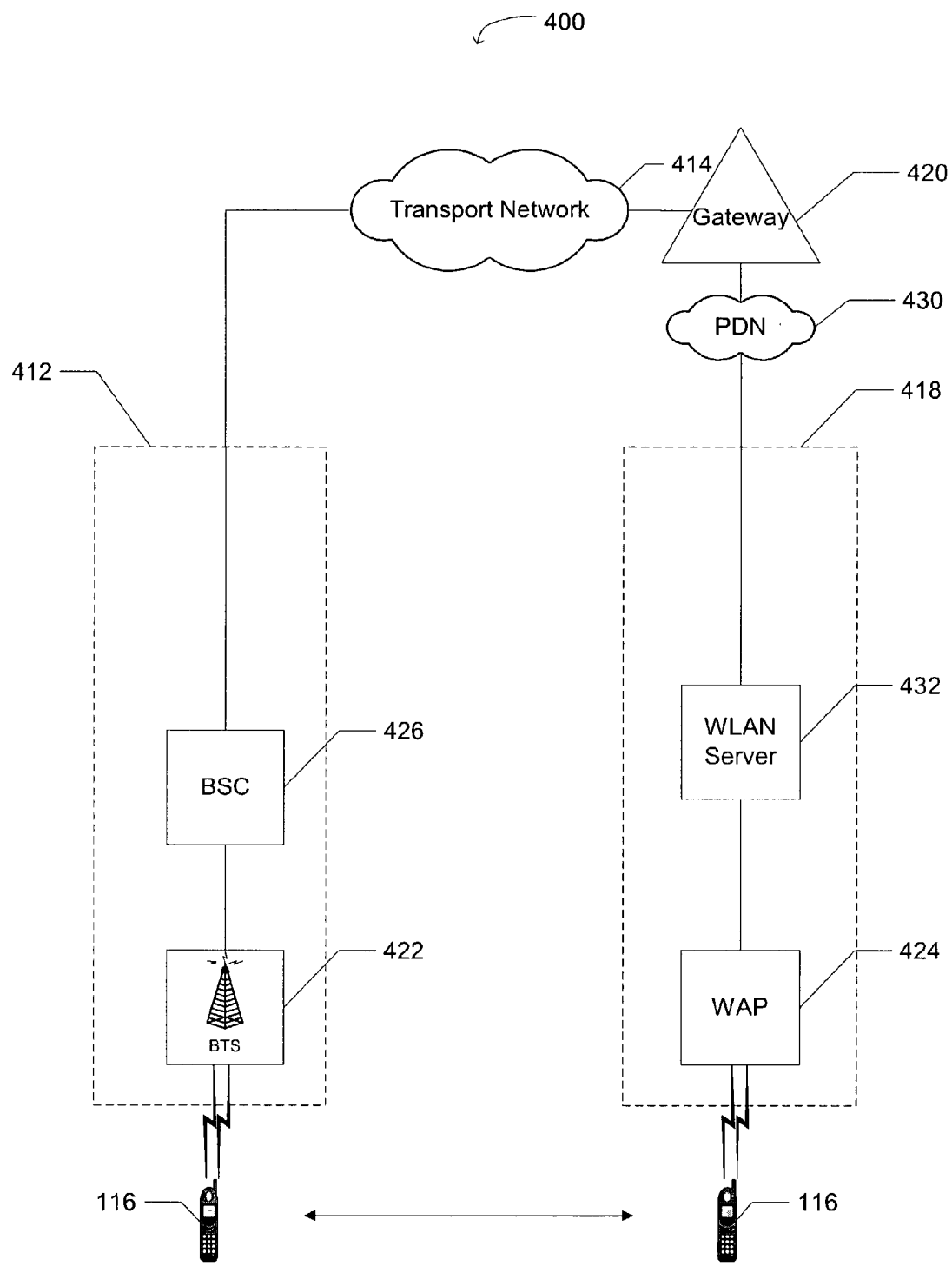
FIG. 4 is a second block diagram depicting an arrangement for carrying out one of the preferred embodiments.

Referring now to FIG. 4, an arrangement 400 is provided to illustrate exemplary architecture for carrying out a communication session hand-off, in accordance with an exemplary embodiment. The arrangement 400 includes a transport network 414, a public wireless network 412 that is communicatively coupled to the transport network 414, and a private wireless network 418 that is also communicatively coupled with the transport network 414. Also included in arrangement 400 is a gateway 420, which is likewise communicatively coupled to the transport network 414.

Public wireless network 412 provides wireless telecommunications services, in a particular geographic coverage area, to its subscribers and, typically, to other wireless networks' subscribers who are roaming in the coverage area of network 412. Generally, any interested member of the public meeting minimal criteria may become a subscriber of public wireless network 412. Additionally, the coverage area of public wireless network 412 is typically wide-ranging. For example, the coverage area of network 412 may encompass a metropolitan area, a substantial part of a metropolitan area, or numerous metropolitan areas.

Similar to the public wireless network 412, the private wireless network 418 may provide geographically limited wireless and wireline telecommunications services to its subscribers. The coverage area of the private wireless network 418, however, maybe more limited than the public wireless network 412. For instance, the coverage area of the private wireless network 418 may include a single building, a part of a building, or a complex of buildings and campuses, but such coverage is unlikely to cover large contiguous areas. Further, the subscriber base of the private wireless network 418 may likewise be more limited than the public wireless network 412. For example, a private wireless network subscriber may be a person, an organization, or other entity (including a computer or computer system) that uses the services provided by the private wireless network 418, after being granted permission to use such services. Private wireless network subscribers may include (i) employees of an enterprise or other organization, who subscribe for as long as remaining employees; (ii) business consultants, who subscribe only for the duration of a particular project; and (iii) members of the general public, who receive a specific communication service from a private wireless network provider, such as in-airport flight updates while in the coverage area of an airport's private wireless network.

The wireless communications provided by public wireless network 412 may conform to a format such as AMPS, TDMA, GSM, CDMA, or some other format. The wireless communications provided by private wireless network 418 may conform to a format such as an IEEE 802.11 wireless local area network protocol (WLAN), AMPS, TDMA, GSM, CDMA, or some other format. Preferably, the public wireless network 412 and the private wireless network 414 do not use the same format. Most preferably, the public wireless network conforms to CDMA, and the private wireless network conforms to the IEEE 802.11 wireless local area network protocol. Details of a preferred CDMA air interface are set forth in the ANSI/TIA/EIA-95-B-99 standard, published by the Telecommunications Industries Association/Electronic Industries Association (TIA/EIA), which standard is fully incorporated herein by reference. Further, the particulars of the preferred wireless communication for the private wireless network 418 are disclosed in the IEEE 802.11 standard published by the Institute of Electrical and Electronics Engineers, Inc., which is fully incorporated herein by reference.

i. Public Wireless Network

When operating in the public wireless network's coverage area, the public wireless network 412 provides telecommunication services, or more simply, "serves" the mobile station 116. As noted above, the public wireless network 412 is communicatively coupled to the transport network 414. As such, the public wireless network 412 provides a first communication path for communications exchanged between the transport network 414, and the mobile station 116, when the mobile station 116 is operating in public wireless network 412. Included in the public wireless network 412 are various interconnected network elements providing one or more segments of the communication path. Included amongst these interconnected network elements are a base transceiver station (BTS) 422 coupled to a base station controller (BSC) 426 that in turn is communicatively coupled to the transport network 414 (as in the case of the transport network 414 representing or providing access to a PSTN).

The BTS 422 generally includes one or more antennas that define a wireless coverage area, or "cell," for the public wireless network 412. Although FIG. 4 illustrates only one BTS, namely BTS 422, the public wireless network 412 may include more than one BTS. In one arrangement, the cell may be partitioned into "sectors" using multiple BTSs that employ directional antennas. Within the coverage area of the cell, the BTS 422 and other BTSs (not shown) may communicate with the mobile station 116 over a wireless interface.

In communications exchanged between the mobile station 116 and the BTS 422, the format of the communications conform to a particular protocol, which typically is defined by the format of the public wireless network. Preferably, in a public wireless network 412 that conforms to the CDMA format, the mobile station 116 and the BTS 422 transmit communications over the wireless interface using the Enhanced Variable Rate Coder (EVRC) standard. Details of the preferred Enhanced Variable Rate Coder standard are set forth in the TIA/EIA/IS-127 standard, published by the Telecommunications Industries Association/Electronic Industries Association (TIA/EIA), which standard is fully incorporated herein by reference.

The BSC 426 typically manages the BTSs under its control; managing such parameters as the BTSs' power levels and frequencies transmitted. The BSC 426 may also control communication session hand-offs for the mobile station 116 moving between the several BTSs. Accordingly, the BSC 426 may contain (intelligent) switching functionality, generally found within the domain of other network elements, such as a mobile switch center (MSC). After receiving instructions or "signaling" to direct a given communication session to the transport network 414 from a mobile switch center (not shown), the gateway 420, or some other switch, the BSC 426 may then provide a communication path between the mobile station 116 and the transport network 414. Although other signaling systems may be used, the signaling between the BSC 426 and the mobile switch center, the gateway 420, or some other switch may be carried out using IS-41 or GSM Mobile Application Part MAP (GSM MAP). Details of the IS-41 signaling system may be found in the ANSI/TIA/EIA-41-D-97 standard, which was published in 1997, and which is fully incorporated herein by reference. Furthermore, the details of GSM MAP signaling system may be found in the European Telecommunications Standards Institute ETS 300 599 ed.9 standard (GSM 09.02 version 4.19.1), which was published in 2001, and which is fully incorporated herein by reference.

Preferably, the content of a communication session transmitted by the BSC 426 to the transport network 414 contains encoded and vocoded voice or bearer content in accordance with a protocol such as International Telecommunications Union (ITU) G.711 standard. Other protocols may be used as well. In the preferred CDMA format, the mobile station 116 and BSC 426 exchange the data (including voice content) of the communication session according to the EVRC standard. For example, if the transport network 414 comprises a PSTN, when the BSC 426 receives outgoing EVRC data from the mobile station 116, it may convert the outgoing EVRC data into Pulse Code Modulation (PCM) data. Thereafter, the BSC 426 may transmit the PCM data into the transport network 414, which may then be transmitted to the gateway 420. Conversely, when the BSC 426 receives incoming data in PCM data, then it may convert or encode the incoming data into incoming EVRC data for transmission to the mobile station 116.

Although shown as an element separate from the BTS 422, as an alternative, the BSC 426 may be co-located with one of the BTSs. As another alternative, the BSC 426 may be co-located with a mobile switching center (not shown), or conversely, the functions carried out by the mobile switching center may be integrated into BSC 426. In yet another alternative, the BSC 426 may not be used at all, and in which case one or more of the various interconnected elements of the public wireless network may carry out its functions.

ii. Private Wireless Network

Arrangement 400 also includes private wireless network 418 that is communicatively linked with the transport network 414 via a PDN 430. When registered in the private wireless network 418 and in the coverage area of the private wireless network, the mobile station 116 may be served telecommunication services by the private wireless network 418. Analogous to the public wireless network 412, the private wireless network 418 provides a second communication path for communications exchanged between the transport network 414 and the mobile station 116. Preferably, the coverage area of the private wireless network 418 and the coverage area of the public wireless network overlap; however, such overlap is not required. In an overlap situation, when registered in the private wireless network 418, the mobile station 116 may be simultaneously registered in the public wireless network. Further details regarding the communication control for simultaneous registration of a mobile station in both a public wireless network and private wireless network are provided by co-pending U.S. application Ser. No. 09/595,595, filed on Jun. 15, 2000, and titled "Private Wireless Network Integrated with Public Wireless Network," which is fully incorporated herein by reference.

The private wireless network 418 comprises various interconnected network elements that provide one or more segments of the second communication path. In the IEEE 802.11 WLAN preferred embodiment of the private wireless network 418, the WLAN includes a wireless access point 424 interconnected with a WLAN server 432.

The wireless access point 424 provides base station functionality for the WLAN. Base station functionality furnishes the mobile station with access to the WLAN via the wireless interface. In addition to furnishing access for the mobile station 116 to exchange communications with the WLAN, the wireless access point 424 also acts as a bridge or "portal" between the mobile station 116 and the WLAN server 432. The wireless access point 424 performs portal functions by providing address and protocol translation for communications exchanged between the wireless access point 424 and the WLAN server 432. Exemplary architecture to carry out these functions may be provided by a wireless access point 424 that consist of a radio transceiver, a wired-network interface, and a bridging-software application, which preferably conforms to the IEEE 802.11d bridging standard.

Alternatively, the portal's functionality may be integrated into the WLAN server 432, so that communications exchanged between the wireless access point 424 and the WLAN server 432 are transmitted without being translated. As another option, the portal may comprise a standalone WLAN network element, for example, a bridge or gateway interconnecting the wireless access point 424 and WLAN server 432.

In a communication session, the wireless access point 424 communicates with the mobile station 116 over the wireless interface according to the IEEE 802.11 protocol format. If functioning as a portal, the wireless access point 424 may translate the communication session from the IEEE 802.11 protocol format into an IEEE 802.3 protocol, or other packet-data format for transport to the WLAN server 432.

Situated between the transport network 414 and the wireless access point 424 is the WLAN server 432, the gateway 420 as well as other various interconnected network elements. The WLAN server 432 provides a portion of the second communication path for routing communications between the wireless access point 424 and the transport network 414. Exemplary architecture for the WLAN server 432 may include a processor, e.g., personal computer or workstation, or a peripheral device, such as a data storage device, that runs operating and application software for managing the resources for the WLAN.

In the preferred embodiment, the WLAN server 432 includes architecture and application software that allows the WLAN server 432 to communicate with the gateway 420 according to the Internet Protocol. As described in more detail below, for handing off a communication session engaged in by the mobile station 116, the WLAN server 432 may take advantage of the ability to communicate according to the Internet Protocol.

Although FIG. 4 illustrates only one access point 424, and one WLAN server 432, the private wireless network 418 may include one or more wireless access points and one or more WLAN servers. Alternatively, the private wireless network 418 might not include a WLAN server 432 as a separate element, in which case the functions of the WLAN server 432 may be integrated into the wireless access point 424. In yet another arrangement, the private wireless network might not include either a wireless access point or WLAN server as separate network elements. And, as such, the wireless access point's functionality and WLAN server's functionality may be integral to or integrated into one or more of the other various interconnected private wireless network elements (not shown).

iii. Gateway

As noted above, illustrated in FIG. 4 is gateway 420 that is communicatively coupled to the transport network 414 and to the WLAN server 432 via the PDN 430. Gateway 420 provides a protocol encapsulation/unencapsulation function for facilitating a hand-off of an ongoing communication session engaged in by the mobile station 116 via the public wireless network 412 or via the private wireless network. Gateway 420 may also provide an encoding function to encode and decode data of the ongoing communication session. Additionally, gateway 420 may include switching functionality to switch from routing the ongoing communication session to the mobile station 116 via the public wireless network 412 to routing the ongoing communication session to the mobile station 116 via the private wireless network 418 (and vice versa).

Figure 5:
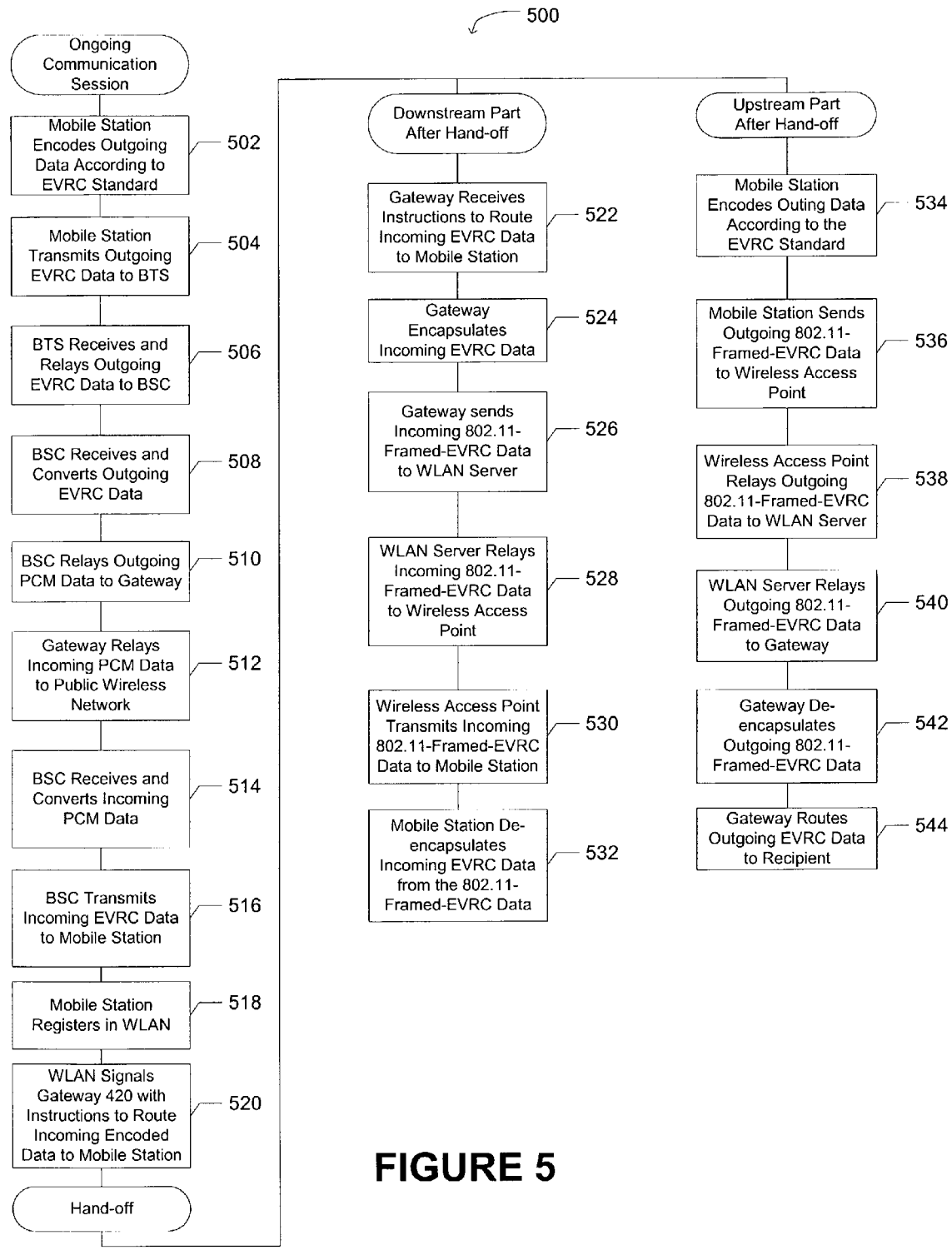
FIG. 5 is a third flow chart further illustrating the functions used to accomplish a communication session hand-off in accordance with an exemplary embodiment.

B. Functions for Accomplishing a Public Wireless Network to a Private Wireless Communication Session Hand-off Referring next to FIG. 5, a flow chart 500 is provided for further illustrating the functions used to accomplish a communication session hand-off in accordance with an exemplary embodiment. The exemplary embodiment illustrated in FIG. 5 is described with reference to FIG. 4, in which an ongoing communication session engaged in by the mobile station 116 via the public wireless network 412 is handed-off to the mobile station 116 operating in the private wireless network 418. It should be understood that the particular order of functions as set forth and described herein can vary from that presented.

Further, in the example of FIG. 5, the format of the public wireless network 412 is CDMA, and the mobile station 116 communicates with the BTS 422 using the EVRC standard. The format of the private wireless network complies with IEEE 802.11 WLAN protocol in which the mobile station 116 communicates with the wireless access point 424 using IEEE 802.11 protocol. Moreover, for illustration purposes, the transport network 414 comprises a PSTN.

i. Engaging in a Pre-Hand-Off Communication Session in the Public Wireless Network At block 502, the mobile station 116 using the EVRC standard encodes outgoing data of the ongoing communication session. This encoding produces outgoing EVRC data. Once encoded, the mobile station 116, at block 504, transmits the outgoing EVRC data to the BTS 422. The mobile station 116, however, may translate the outgoing EVRC data before passing it the BTS 422. If the mobile station 116 translates the outgoing EVRC data, then preferably, the translation conforms with one or more of the following CODECS: (i) Pulse Code Modulation (PCM), (ii) Adaptive Differential Pulse Code Modulation (ADPCM), (iii) Code-Excited Linear Predictive (CELP), (iv) Adaptive Code-Excited Linear Predictive (ACELP), (v) Relaxed Code-Excited Linear Predictive (RCELP), (vi) Selective Mode Vocoder (SMV), (vii) Linear Predictive Coding (LPC), (viii) Sinusoidal Transform Coder (STC), (ix) Improved Multiband Excitation (IMBE), (x) CDMA Qualcomm Code-Excited Linear Predictive (QCELP), (xi) CDMA4000-SMV, (xii) Adaptive Multirate GSM (AMR-GSM), (xiii) Federal Standard 1017, (xiv) IS-54, (xv) IS-641, and/or other CODEC.

At block 506, the BTS 422 receives and relays the outgoing EVRC data to the BSC 426. The BSC 426, at block 508, receives the outgoing EVRC data, and preferably converts the outgoing EVRC data into outgoing PCM data for transmission to the transport network 414, and in turn to the gateway 420. At block 510, the BSC 426 relays the outgoing PCM data using the ITU G.711 standard or some other transmission standard to the transport network 414 for transmission to the recipient.

For the downstream part of the communication session, upon receiving incoming PCM data, the gateway 420 simply relays the incoming PCM data to the public wireless network 412, as shown in block 512. If, on the other hand, the gateway 420 receives incoming data that is not PCM encoded, the gateway 420 may encode the incoming data, to produce incoming PCM data before sending it to the BSC 426. At block 514, the BSC 426 receives the incoming PCM data, and preferably converts the incoming PCM data to incoming EVRC data for transmission to the mobile station 116. At block 516, the BSC 426 transmits the incoming EVRC data to the mobile station 116 via the BTS 422.

ii. Mobile Station Registering in the Private Wireless Network

During the ongoing communication session in the public wireless network 412, as noted in block 518, the mobile station 116 registers with the WLAN. Registering with the WLAN, in the simplest form, may include merely "associating" the mobile station 116 with the WLAN, preferably via the wireless access point 424. Registering with the WLAN, however, may also include "logging" into the WLAN, which may include providing a username and password. Further, registering with the WLAN may include employing secure connection services such as IEEE 802.11 Wired Equivalency Privacy (WEP), security system identification (SSID), or extensible authentication protocol (EAP).

The process of associating the mobile station 116 with the WLAN may include one or more steps that occur during the ongoing communication session. Although described in more detail in the IEEE 802.11 protocol, an example of associating the mobile station 116 and WLAN may be illustrated with the following three steps. First, the mobile station 116 senses the wireless medium, and if the medium is free (i.e. no other mobile station currently transmitting to the wireless access point 424), then the mobile station 116 transmits a request for synchronization information from the wireless access point 424. If, however, the wireless medium is busy, the mobile station 116 delays transmission for a period of time before re-requesting the synchronization information. Once the synchronization information is received, the mobile station 116 adjusts as needed, and then synchronizes with the wireless access point.

Second, after the mobile station 116 receives the synchronization information and synchronizes with wireless access point 424, the mobile station 116 then "authenticates" with the WLAN. To authenticate, the mobile station 116 exchanges frames, or packet-data, with the wireless access point 424, which eventually results in the mutual verification of identity. To continue with the process of association, the mobile station 116 and the wireless access point 424 mutually authenticate. If either the mobile station 116 or the wireless access point 424 do not mutually authenticate, then the wireless access point 424 de-authenticates or otherwise denies WLAN access to the mobile station 116.

Third, once authenticated, the mobile station 116 sends an association request to the wireless access point 424, which may include sending an IEEE 802.11 or some other format packet-data address (802.11 address) of the mobile station 116. The association request may also include the 802.11 address of the wireless access point 424. In response to the association request, the wireless access point 424 sends the mobile station 116 an association response, which contains either a "successful" or "unsuccessful" association result. Upon "successful" association, the response includes an association identifier that notifies the mobile station 116 that the WLAN had data ready to send to it. Once associated, the mobile station 116 is capable of transmitting and receiving communications with the WLAN.

In addition to the three steps noted above, when roaming or otherwise outside the coverage area of wireless access point 424, the process of association with the WLAN may include the mobile station 116 "re-associating" with the other wireless access points, with or without disassociating with wireless access point 424. Once re-associated, the WLAN subscriber's mobile station 116 is capable of communicating with the other wireless access points, and if still associated, with wireless access point 424.

iii. Signaling For Hand-Off to the Private Wireless Network

After registering, the WLAN signals the gateway 420 with instructions to route incoming EVRC data, incoming PCM data, and/or other similarly encoded data to the mobile station 116 via the WLAN, as shown in block 520. The process of the WLAN signaling the gateway 420 may include the WLAN server 432 exchanging messages with the gateway 420 using an appropriate protocol, such as the simple mail transfer protocol (SMTP), the hypertext transfer protocol (HTTP), the file transfer protocol (FTP), the file service protocol (FSP), the session initiation protocol (SIP), the media gateway control protocol (MGCP), and/or some other protocol. Included within the exchanged messages are the instructions to route the incoming EVRC data to the mobile station 116 via the WLAN.

The instructions to route the incoming EVRC data may take a variety of forms, such as text and/or numerical messages, and/or proprietary coded messages. If the gateway 420 conforms to a standardized signaling system, such as IS-41 and/or IS-771, then the WLAN server 432 may signal using such standardized signaling system. Details of the IS-41 signaling system may be found in the ANSI/TIA/EIA-41-D-97 standard, which was published in 1997, and which is fully incorporated herein by reference. Furthermore, the details of IS-771 may be found in ANSI/TIA/EIA-771 standard, which was published in July 1999 (and the TIA/EIA-771-1 addendum most recently published on Aug. 1, 2001), and which is likewise fully incorporated herein by reference.

However, before WLAN server 432 is able to signal the gateway 420, the WLAN server 432 may receive an indication that the mobile station is registered with the WLAN. This indication may be provided by the wireless access point 424, which notifies the WLAN server 432 by sending it association notification message that the mobile station 116 has associated. Preferably, the wireless access point 424 notifies the WLAN server 432 using an Ethernet link. In response to the notification message, the WLAN server 432 may immediately signal the gateway 420 with the instructions to route the incoming EVRC data to the mobile station 116 via the WLAN. Alternatively, the WLAN server 432 may wait a period of time before signaling the gateway 420. Waiting the period of time may allow handing off the ongoing communication to the mobile station 116 via the WLAN without a cognizable delay. Otherwise, an identifiable delay or break in the ongoing communication may result.

As an alternative to the WLAN server 432 directly signaling the gateway 420, after registering, the WLAN server 432 may signal one or more of the various other components in the public wireless network, such as a mobile switching center, with the instructions to route incoming EVRC data, incoming PCM data, and/or other similarly encoded data to the mobile station 116 via the WLAN. The WLAN server 432 may signal the mobile switching center by exchanging messages using SMTP, HTTP, FTP, FSP, SIP, MGCP, IS-41, IS-771, and/or some other protocol. Again, included within the exchanged messages are the instructions to route the incoming EVRC data, incoming PCM data, and/or other similarly encoded data to the mobile station 116 via the WLAN. The mobile switching center then relays the instructions to the gateway 420 using the appropriate signaling system.

As another alternative, where the wireless access point 424 is integral to or otherwise integrated into the WLAN server 432, the wireless access point 424 may signal the gateway 420 directly or indirectly using one or more of the various other components in the public wireless network. Like the WLAN server 432, the wireless access point 424 may signal the mobile switching center by exchanging messages with the instructions to route the incoming EVRC data, incoming PCM data, and/or other similarly encoded data to the mobile station 116 via the WLAN using SMTP, HTTP, FTP, FSP, SIP, MGCP, IS-41, IS-771, and/or some other protocol. If the wireless access point 424 exchanges messages indirectly using a mobile switching center, for example, then the mobile switching center relays instructions to the gateway 420 using the appropriate signaling system. Other arrangements are possible, as well.

iv. Handing-Off

At some time after the mobile station 116 registers with the private wireless network 418, the gateway 420 receives the instructions to route the incoming EVRC data, incoming PCM data or similarly encoded data, to the mobile station 116, via the WLAN, as shown in block 522. If, after receiving instructions to route the similarly encoded data to the private wireless system 418, the gateway 420 receives incoming data that does not conform to the EVRC standard, it may preferably encode the incoming data according to EVRC. While EVRC is a preferred encoding standard, which is used in the public wireless system 412, other public wireless network encoding protocol/standards are likewise used by in the public wireless system 412.

As shown in block 524, the gateway 420, encapsulates the EVRC data in one or more IEEE 802.11 frames (802.11 frame) to produce incoming 802.11-framed-EVRC-data packages. At block 526, the gateway 420 then sends the incoming 802.11-framed-EVRC-data packages to the WLAN Server 432, using the appropriate connection or connectionless oriented transfer mechanism. Preferably, the gateway 420 sends the incoming 802.11-framed-EVRC-data packages to the WLAN server 432 using a UDP/IP link. The incoming 802.11-framed-EVRC-data packages may be sent using other transmission protocols, as well.

Upon arriving at the WLAN Server 432, the incoming 802.11-framed-EVRC-data packages are relayed to the wireless access point 424, at block 528. The wireless access point 424 then transmits the incoming 802.11-framed-EVRC-data packages to the mobile station 116, as shown in block 530.

The mobile station 116 receives the incoming 802.11-framed-EVRC-data packages, and then unencapsulates or uncovers the incoming EVRC data from the incoming 802.11-framed-EVRC-data packages at block 532. Upon receiving the unencapsulated incoming EVRC data, the mobile station 116 delivers the incoming data to the recipient preferably using the EVRC encoder/decoder or other voice coder/decoder (VOCODER) that the mobile station 116 uses when communicating with the public wireless network 412.

For the portion of the ongoing communication session emanating from the mobile station 116 after the registration in the WLAN 418, at block 534, the mobile station 116 uses the EVRC vocoder to create outgoing EVRC data. As shown in block 536, outgoing 802.11-framed-EVRC data is transmitted over the wireless interface to the wireless access point 424 after the mobile station 116 encapsulates the outgoing EVRC data in one or more 802.11 frames. Upon receiving the outgoing 802.11-framed-EVRC data, the wireless access point 424 preferably sends the outgoing 802.11-framed-EVRC data to the WLAN server 432 un-translated, as shown in block 538. However, the wireless access point 424 may remove the 802.11 frames from the outgoing 802.11-framed-EVRC data, and then encapsulate the outgoing EVRC data according to a protocol for transmission to the WLAN server 432, the transport network 414, the gateway 420, or any other upstream element.

At block 540, when the WLAN server 432 receives the outgoing 802.11-framed-EVRC data, it may relay the outgoing 802.11-framed-EVRC data to the gateway 432 via the PDN 430. Alternatively, the WLAN server 432 may strip the outgoing EVRC data from the outgoing 802.11-framed-EVRC data. And before sending the outgoing EVRC data to the gateway 420, the WLAN server 432 may convert or translate the outgoing EVRC data into outgoing PCM data according to an intersystem protocol, such as ITU G.711, for transmission to the gateway 432.

The WLAN server 432 preferably sends the outgoing 802.11-framed-EVRC data to the gateway 420 using a UDP/IP link. Alternatively, the WLAN server 432 may send the outgoing 802.11-framed-EVRC data using other transport protocols. After traveling through the PDN 430, the outgoing 802.11-framed-EVRC data arrives at the gateway 420, whereupon, at block 542, the outgoing EVRC data is stripped from the outgoing 802.11-framed-EVRC data by the gateway 420. The gateway 420 then routes the outgoing EVRC data to the transport network 414 for transmission to the recipient, as shown in block 544. As another option, the gateway 420 may translate the outgoing EVRC data into outgoing PCM data before routing it to the transport network 414.

3. Alternative Arrangement for a Public to a Private Wireless Network Hand-off

Figure 6:
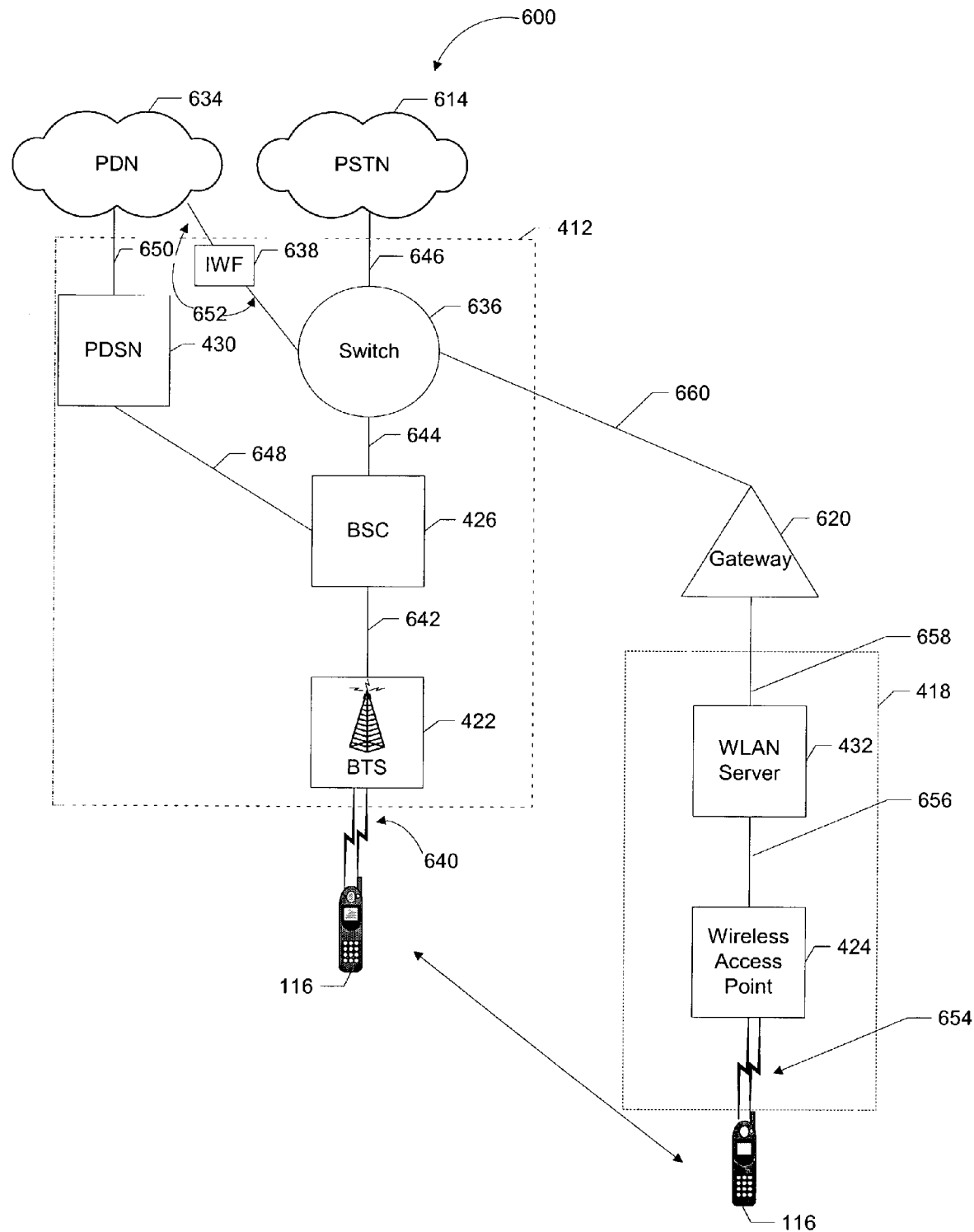
FIG. 6 is a third block diagram depicting an arrangement for carrying out a communication session hand-off in accordance with an exemplary embodiment.

With reference to FIG. 6, an arrangement 600 is provided to illustrate exemplary architecture for carrying out a communication session hand-off in accordance with an exemplary embodiment. The arrangement 600 shown in FIG. 6 is similar in most respects to the arrangement 400 shown in FIG. 4, except as described herein. The arrangement 600 includes a public switched telephone network (PSTN) 614, a packet data network (PDN) 634, and a public wireless network 412 that is communicatively coupled downstream to both the PSTN 614 and the PDN 634.

A. Public Wireless Network

Included in the public wireless network 412 is one or more BTSs, such as BTS 422; one or more BSCs, such as BSC 426; one or more PDSNs, such as PDSN 430; one or more mobile switching centers (MSC), such as MSC 636; and optionally one or more interworking functions, such as interworking function (IWF) 638. Also included in arrangement 600 is a private wireless network 418 that is communicatively coupled with a gateway 620. The gateway 620 is communicatively coupled to the one or more of the MSCs in the public wireless network 412. Preferably, the gateway 620 is communicatively coupled to MSC 636.

In arrangement 600, mobile station 116 is served telecommunications services by the public wireless network 412 when operating in the public wireless network's coverage area. Notably, the public wireless network 412 is communicatively coupled to both of the PSTN 614 and the PDN 634. The PDN 634 may be a public, global packet-data network, such as the Internet. Alternatively, the PDN 634 may be a core, intranet, or other private packet network (core packet network), such as a Sprint PCS packet-data network, which may be integral to or integrated into the public wireless network 412. As another alternative, the PDN 634 may include the core packet network integral to or integrated with the public, global packet-data network. Other configurations are equally possible.

i. Communication Paths Provided by the Private Wireless Network

Given that the public wireless network is communicatively linked to both the PSTN 614 and PDN 634, the flow of communications to the mobile station 116 operating in the public wireless network may take different paths. In addition, the type of communication may also affect its path. Furthermore, the protocol used for a given communication may vary depending on which segment of the communication path the communication is flowing. A first communication path is provided between the mobile station 116 and the PSTN 614 for primarily voice communication; however, data may also be transported across the first communication path. Additionally, a second communication path is provided between the mobile station 116 and the PDN 634 for primarily data communication; however, voice may also be transported across the second communication path.

(1) First Communication Path

The first communication path includes one or more communication-path segments, such as a first segment 640, a second segment 642, a third segment 644, and a fourth segment 646, whereas the second communication path includes the first segment 640, the second segment 642, a fifth segment 648, and a sixth segment 650. These segments do not necessarily indicate physical coupling or trunking between the elements illustrated in FIG. 6, but may include other network elements connected in-between.

Across the first segment 640, when operating in public wireless network 412, the mobile station 116 communicates with BTS 422 over a wireless interface using the wireless interface protocol of the public wireless network, such as the EVRC standard in a CDMA network. Over the second segment 642, which communicatively couples the BTS 422 and the BSC 426, communications are preferably exchanged via an intrasystem protocol of the public wireless network, which by way of example, in a CDMA network, may be the EVRC standard. Following along the first communication path, the protocol of the third segment 644, which communicatively couples the BSC 426 and the MSC 636, is generally an intersystem protocol of the public wireless system, such as ITU G.711. The protocol of the next segment or the fourth segment 646, which communicatively couples the MSC 634 and the PSTN 614, is likewise the intersystem protocol of the public wireless system.

(2) Second Communication Path

The second communication path diverges from the first communication path upstream from the BSC 426. For communications sent over the fifth segment 648, which couples the BSC 426 and PDSN 430, the protocol used preferably includes the intrasystem protocol. For the sixth segment 650, the protocol used to exchange communications between the PDSN 430 and the PDN 634 is generally one or more protocols used for communicating with the PDN 634. Such protocols may include UDP/IP, TCP/IP, and/or SIP.

(3) Third Communication Path

The arrangement 600 also includes the IWF 638 that is communicatively coupled to the MSC 636 and the PDN 634. The IWF 638 permits the exchange of communications between the mobile station 116 and the PDN 634 using a third communication path. In addition to providing a third communication path that includes the first segment 640, the second segment 642, the third segment 644, and a seventh segment 652, the IWF 638 provides a conversion or translation function. For example, in a communication between the mobile station 116 and the PDN 634 in a CDMA network, the protocol of communication between the MSC 636 and the IWF 638 is generally PCM. The protocol of the communication between the IWF 638 and the PDN generally includes the protocols used by the PDN 634, preferably TCP/IP. Accordingly, in a communication between a CDMA network and a PDN 634 via the IWF 638, the IWF 638 translates the from the PCM protocol to the TCP/IP.

B. Private Wireless Network

Arrangement 600 also includes private wireless network 418 that is communicatively coupled with the gateway 620, which in turn is communicatively coupled with MSC 636. The private wireless network 418 includes various interconnected network elements that communicatively couple the mobile station 116 to the gateway 620. As described above in reference to arrangement 400, the private wireless network may be embodied as an IEEE 802.11 WLAN. Included in the WLAN is a wireless access point 424 interconnected with a WLAN server 432, which is communicatively positioned between the gateway 620 and the wireless access point 424.

After registering with the private wireless network 418, the mobile station 116 may be served telecommunication services by the WLAN via the wireless access point 424. Thus, with the private wireless network 418 (embodied as a WLAN and its various interconnected elements) communicatively coupled to the gateway 620, which in turn is communicatively coupled to the MSC 636, a fourth and a fifth communication path are provided for communications exchanged between the mobile station 116 via the PSTN 614 and the PDN 634, respectively.

i. Communication Paths Provided by the Private Wireless Network

In the private wireless network 418 embodied as a WLAN, the fourth and fifth communication paths might not differ, except in a connectionless environment where a communication may use different WLAN elements to reach its destination. Consequently, the fourth and fifth communication paths both include the same segments, namely an eighth segment 654, a ninth segment 656, a tenth segment 658, and an eleventh segment 660. Outside the private wireless network 418, however, the fourth and fifth communication paths diverge upstream from the MSC 636.

(1) Fourth and Fifth Communication Path

Given that the fourth communication path communicatively links the mobile station 116 and the PSTN 614 via the private wireless network 418, preferably, the segments of the first communication path upstream from the MSC 636 are contained in the fourth communication path. And given that the fifth communication path is provided between the mobile station 116 and the PDN 634, preferably, the segments of the second communication path upstream from the MSC 636 are contained in the fifth communication path. While non-voice data may be transported, the fourth communication path is provided primarily for voice communications. On the other hand, non-voice data is primary carried on the fifth communication path, but voice communications may also be transported.

The eighth segment 654 of the fourth and fifth communication path is the wireless interface over which the mobile station 116 communicates with the wireless access point 424 according to the WLAN protocol. Preferably, communications across the eighth segment 654 are sent according to the IEEE 802.11 protocol. Once received, the wireless access point 424 may translate the communications from the IEEE 802.11 protocol format into an IEEE 802.3 protocol, or other packet-data format for transport across the ninth segment 656 to the WLAN server 432. Conversely, WLAN server 432 may send the wireless access point 424 communications according to the IEEE 802.3 protocol, which the wireless access point 424 may then translate as needed. Alternatively, if the wireless access point 424, and/or portal functions are integral to and/or integrated into the WLAN server 432, the eighth and the ninth segment collapse into one segment over which communications preferably conform to the IEEE 802.11 protocol.

Across the tenth segment 658, which communicatively couples the WLAN server 432 to the gateway 620, communications are preferably transmitted according to the IEEE 802.3 protocol, however, communications may be exchanged using other protocols. The eleventh segment 660 couples the gateway 620 to the MSC 636. A communication transported between the gateway 620, and the MSC 636 may be transported according to the intersystem protocol of the public wireless network 412, such as ITU G.711.

C. Gateway

Located between the tenth and eleventh segment of the fourth and fifth communication path is gateway 620. The gateway 620 may provides a protocol encapsulation/unencapsulation function for communications that pass through it. The gateway 620 may also provide an encoding function to encode and decode data of a communication. For facilitating a hand-off of a communication session engaged in by the mobile station 116 via the public wireless network 412 to the mobile station 116 in the private wireless network 418, the gateway 620 may include switching functionality for routing a communications to the mobile station 116, in addition to the encapsulation/unencapsulation and the encoding functions.

Exemplary architecture of gateway 620 includes a (i) signaling controller for signaling elements of the private and public wireless networks, (ii) a media gateway for sending and receiving communications over a packet-switched data network, and (iii) a media gateway controller for intermediating communications between the media gateway and the signaling controller, and for translating communications between a packet data network, and a PSTN. Details regarding a preferred, exemplary architecture of the gateway 620 are provided by another U.S. patent application filed concurrently with this document, naming the same inventors, and entitled "Method and System for Diverting Wireless Network Communications," which is fully incorporated herein by reference.

Figure 7:
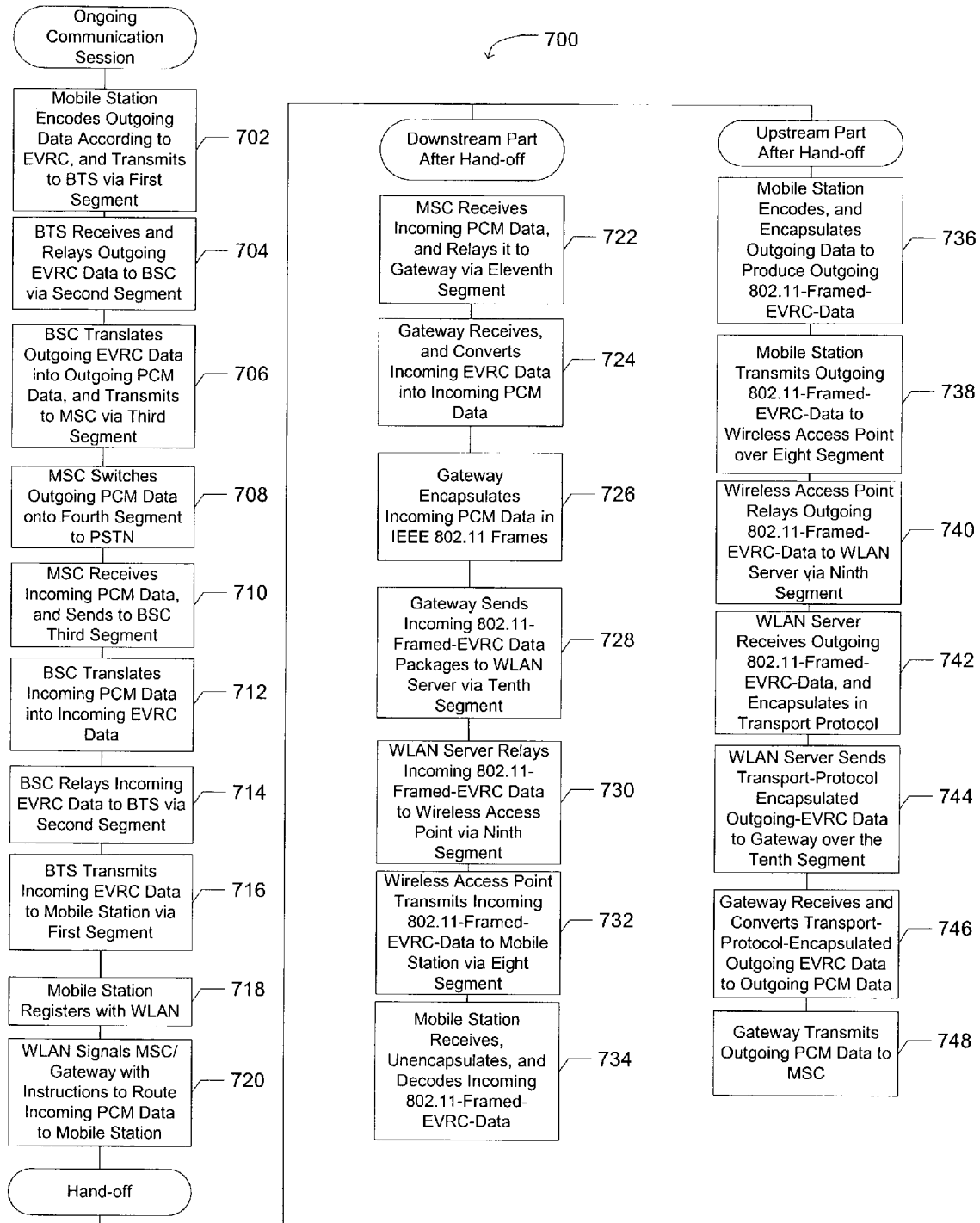
FIG. 7 is a fourth flow chart illustrating the functions used to accomplish a communication session hand-off in accordance with an exemplary embodiment.

D. Alternative Functions for Accomplishing a Public to a Private Wireless Hand-off Referring next to FIG. 7, a flow chart 700 is provided to illustrate the functions used to accomplish a communication session hand-off in accordance with an exemplary embodiment. The exemplary embodiment illustrated in FIG. 7 is described with reference to FIG. 6 in which an ongoing communication session engaged in by the mobile station 116 via the public wireless network 412 is handed-off to the mobile station 116 operating in the private wireless network 418. Given that there are two communication paths, namely the fourth and fifth communication path, the following describes the ongoing communication session occurring over the first communication path handed-off to the mobile station 116 via the fourth communication path. The differences in a hand-off of an ongoing communication session occurring over the second communication path to the fifth communication path occur upstream from MSC 636, and those of average skill in the art will recognize the differences as between the mobile station 116 communicating via a PDN verses communicating via a PSTN. It should be understood that the particular order of functions as set forth and described herein can vary from that presented.

Further, as described in reference to FIG. 6, the format of the public wireless network 412 is CDMA, and the mobile station 116 communicates with the BTS 422 using EVRC standard. The format of the private wireless network complies with IEEE 802.11 WLAN protocol in which the mobile station 116 communicates with the wireless access point 424 using IEEE 802.11 protocol. Moreover, the ongoing communication session comprises an upstream part that emanates from the mobile station 116, and a downstream part that emanates from the PSTN 614. The upstream part includes outgoing data formatted according to the protocol of the particular segment through which the ongoing communication session is traveling. Analogously, the downstream part includes incoming data that is formatted according to the protocol of the particular segment through which the ongoing communication session is traveling.

i. Engaging in a Pre-Hand-Off Communication Session in the Public Wireless Network In the ongoing communication session, at block 702, the mobile station 116 produces outgoing EVRC data by encoding outgoing data using the EVRC standard. Also shown in block 702, the mobile station transmits the outgoing EVRC data to the BTS 422 over the first segment 640. At block 704, the BTS 422 receives and relays the outgoing EVRC data to the BSC 426 via the second segment 642. The BSC 426 preferably translates the outgoing EVRC data into outgoing PCM data, and then transmits the outgoing PCM data to the MSC 636 using the third segment 644, as shown in block 706. The MSC 636, which controls the flow of the ongoing communication session over the third segment 644 and fourth segment 646, switches the outgoing PCM data onto the fourth segment 646 for transport into the PSTN 614, as shown in block 708.

At block 710, in the downstream part of the ongoing communication session, the incoming data preferably arrives at the MSC 636 as incoming PCM data, i.e. incoming data formatted according to the ITU G.711 standard. The MSC 636 then sends the incoming PCM data to the BSC 426 over the third segment 644, also shown in block 710. Upon receipt of the incoming PCM data, the BSC 426 translates the incoming PCM data into incoming EVRC data, at block 712. Next, at block 714, the BSC 426 relays the incoming EVRC data to the BTS 422 over the second segment 642 for transmission to the mobile station 116. At block 716, the BTS 422 transmits the incoming EVRC data to the mobile station over the first segment 640.

ii. Registering in the Private Wireless Network, and Signaling for Hand-Off

During the ongoing communication session in the public wireless network 412, at block 718, the mobile station 116 registers with the WLAN. As described above, the mobile station 116 may register with the WLAN by merely associating, or may require more substantiation. After registering, to initiate the hand-off of the ongoing communication, the WLAN (having an element with intelligent switching capability) may signal the MSC 636 with instructions to route incoming PCM data or other similarly encoded data of the ongoing communication session to the mobile station 116 via the WLAN, as shown in block 720.

Alternatively, the WLAN may signal the gateway 620 with instructions to route the incoming PCM data or other similarly encoded data to the mobile station 116 via the WLAN. Following the signaling, the gateway 620 may exchange signaling with the MSC 636, to instruct the MSC 636 to route incoming PCM data or other similarly encoded data of the ongoing communication session to the mobile station 116 via the WLAN.

Signaling the MSC 636 may include the WLAN server 432 exchanging messages with the MSC 636 using signaling system messages, such as IS-41 and/or IS-771 signaling messages, encapsulated in an appropriate protocol, such as SMTP, HTTP, FTP, FSP, SIP, MGCP, and/or some other protocol. If the WLAN server 432 contains a signaling controller for signaling using a standard signaling system, the WLAN server 432 may signal the MSC 636 accordingly. Alternatively, signaling the gateway 620 may similarly include the WLAN server 432 exchanging messages with the gateway 620 using signaling system messages in accordance with MGCP. In turn, the gateway 620 exchanges signaling messages with the MSC 636 using a standard signaling system, such as IS-41. This exchange of signaling messages may cause the MSC 636 to route the incoming PCM data to the gateway 620. In any case, signaling the MSC 636 may be performed using signaling that conforms to other protocols.

iii. Handing-Off

After the MSC 636, directly or indirectly, receives the signaling messages containing the instructions to route the incoming PCM data to the mobile station 116, the MSC 636 switches from sending the incoming PCM data to BSC 426, to sending the incoming PCM data to the gateway 620. At block 722, the MSC 636 receives the incoming PCM data or other similarly encoded data, and relays it to the gateway 620 across the eleventh segment 660. While PCM is a preferred encoding standard, other public wireless network encoding protocol/standards may be used by the public wireless system 412 as well.

As shown in block 724, the gateway 620 receives, and converts the incoming PCM data into incoming EVRC data. As shown in block 726, the gateway 620 encapsulates the incoming EVRC data in one or more IEEE 802.11 frames (802.11 frame) to produce incoming 802.11-framed-EVRC-data packages. At block 728, the gateway 620 then sends the incoming 802.11-framed-EVRC-data packages to the WLAN Server 432 over the tenth segment 658, using the appropriate connection or connectionless oriented transfer mechanism. Preferably, the gateway 620 sends the incoming 802.11-framed-EVRC-data packages to the WLAN server 432 using a UDP/IP over an IEEE 802.3 link. The incoming 802.11-framed-EVRC-data packages may be sent using other transmission protocols, as well. Upon arriving at the WLAN Server 432, the incoming 802.11-framed-EVRC-data packages are relayed to the wireless access point 424 over the ninth segment 656, as shown in block 730. The wireless access point 424 then transmits over the eighth segment the incoming 802.11-framed-EVRC-data packages to the mobile station 116, as shown in block 732.

At block 734, the mobile station 116 receives the incoming 802.11-framed-EVRC-data packages, and then unencapsulates incoming EVRC data from the incoming 802.11-framed-EVRC-data packages. Upon uncovering the incoming EVRC data, the mobile station 116, using its public wireless network EVRC vocoder, delivers the decoded incoming EVRC data to the recipient.

In addition to receiving incoming data of the ongoing communication session via the WLAN after registering, the mobile station 116 may continue the ongoing communication in the upstream part. At block 736, the mobile station 116 uses its EVRC vocoder to create outgoing EVRC data, and then encapsulates the outgoing EVRC data in one or more 802.11 frames producing outgoing 802.11-framed-EVRC data. The mobile station 116 transmits the outgoing 802.11-framed-EVRC data over the eighth segment 654 to the wireless access point 424, as shown in block 738. Once the outgoing 802.11-framed-EVRC data is received, the wireless access point 424 relays it across the ninth segment to the WLAN server 432, as shown in block 740. Preferably, the outgoing 802.11-framed-EVRC data is relayed un-translated. The wireless access point 424, however, may further encapsulate the outgoing 802.11-framed-EVRC data in headers of the protocol used for transmission to the WLAN server 432 before relaying the outgoing 802.11-framed-EVRC data.

At block 742, when the WLAN server 432 receives the outgoing 802.11-framed-EVRC data, it may relay the outgoing 802.11-framed-EVRC data over the tenth segment 658 to the gateway 620 unchanged. Alternatively, the WLAN server 432 may unencapsulate the outgoing EVRC data from the outgoing 802.11-framed-EVRC data, and then encapsulate the outgoing EVRC data in headers of a transport protocol, such as UDP/IP, for transmission to the gateway 620, which may obviate the gateway 620 from performing the encapsulation/unencapsulation function. The WLAN server 432 then sends the UDP/IP-encapsulated outgoing EVRC data to the gateway 620 over the tenth segment 658, as shown in block 744.

If the gateway 620 receives the outgoing 802.11-framed-EVRC data, it may unencapsulate the outgoing EVRC data from the outgoing 802.11-framed-EVRC data. Then, the gateway 620 may convert the outgoing EVRC data into outgoing PCM data for transmission over the eleventh segment 660 to the MSC 636. On the other hand, if the gateway 620 receives UDP/IP-encapsulated outgoing EVRC data, the gateway 620 may strip the headers from the UDP/IP-encapsulated outgoing EVRC data to uncover the outgoing EVRC data, as shown in block 746. The gateway 620 may then convert or translate the outgoing EVRC data into outgoing PCM data. Thereafter, the outgoing PCM data is relayed to the MSC 636, and in turn to the PSTN 614 as if it emanated from the mobile station 116 when operating the public wireless network 412, as shown in block 748.

4. Hand-Off From Second To First Access System

In the embodiments previously discussed, an ongoing communication engaged in by a mobile station using a first protocol in a first access system is handed off to the mobile station in a second access system using a second protocol in which the second protocol is ideally the first protocol encapsulated in headers of the second protocol. The mobile station may benefit from a hand-off of an ongoing communication session from the second access system, using the second protocol, to the first access system, using the first protocol, in which the second protocol is likewise the first protocol encapsulated in headers of the second protocol. Such a hand-off may be effectuated using the exemplary architecture in FIGS. 1, 4, and 6 without substantial variation.

For example, with reference to FIG. 1, a hand-off of an ongoing communication may occur as follows. Mobile station 116 is engaging in a communication session via the second access network 118. As before, the ongoing communication has an upstream part for the portion of the ongoing communication session emanating from the mobile station 116, and a downstream part for the portion of the communication session emanating from the common transport network 114 destined for the mobile station 116. In the upstream part, the mobile station 116 sends outgoing data to the second access node 124 over the air interface according to a second protocol over the first protocol. For the downstream part, the mobile station 116 receives incoming data from the second access node 124 according to the second protocol over the first protocol.

After registering with the first access system 112 during the communication session that the mobile station 116 is engaging in via the second access system 118, the mobile station 116 continues the ongoing communication session via the first access network 112. While continuing the ongoing communication session, the mobile station 116 engages in the ongoing communication session via the first access network 112 according to the first protocol, instead of the second protocol over the first protocol.

In more detail, an ongoing communication may be handed-off as follows. The mobile station 116, preferably using its second-over-first-protocol mode, encodes the outgoing data of an ongoing communication session according to the first protocol to produce outgoing first-protocol-encoded data. Then, the mobile station 116 encapsulates the outgoing first-protocol-encoded data in headers of the second protocol to produce outgoing second-protocol-encapsulated first-protocol-encoded data. Next, the mobile station 116 sends the outgoing second-protocol-encapsulated first-protocol-encoded data to a second access node 124 for transmission to the common transport network 114.

Upon receipt, the second access node 124 relays the outgoing second-protocol-encapsulated first-protocol-encoded data to the common gateway 120, preferably un-translated. After arriving at the common gateway 120, the outgoing second-protocol-encapsulated first-protocol-encoded data is relayed into the common transport network 114, also preferably un-translated. The common gateway 120, however, may translate the outgoing second-protocol-encapsulated first-protocol-encoded data before sending it into the common transport network 114.

In the downstream part, the common gateway 120 simply relays, upon receipt, the incoming second-protocol-encapsulated first-protocol-encoded data to the second access system 118 for transmission to the mobile station 116. If the common gateway 120 receives incoming data not formatted according to the second protocol over the first protocol, the common gateway 120 encodes the incoming data according to the first protocol, if necessary, and encapsulates it in headers of the second protocol to produce incoming second-protocol-encapsulated first-protocol-encoded data. Afterward, the common gateway 120 sends the incoming second-protocol-encapsulated first-protocol-encoded data to the second access system 118.

At some point, the mobile station 116 registers with the first access network 112. Registering with the first access system causes the common gateway 120 to receive instructions to route the incoming data to the mobile station 116 in the first access system that would otherwise become incoming second-protocol-encapsulated first-protocol-encoded data for transmission to the mobile station in the second access system 118. If the common gateway 120 receives instructions to route the incoming data that would otherwise become incoming second-protocol-encapsulated first-protocol-encoded data, and then receives the incoming data in such form, the common gateway 120 may unencapsulate and decode, as necessary, to send the incoming data to the mobile station 116 in the first access network according to the first-protocol.

Unencapsulating the incoming second-protocol-encapsulated first-protocol-encoded data includes striping the headers of the second protocol from the incoming second-protocol-encapsulated first-protocol-encoded data to uncover the incoming first-protocol-encoded data. Additionally, unencapsulating may include combining or separating the incoming first-protocol-encoded data into one or more parts after stripping the headers of the second protocol.

After unencapsulating, the common gateway 120 sends the incoming first-protocol-data into the first access system 112. Upon arriving at the first access node 122, the incoming first-protocol data is transmitted to the mobile station 116 over the wireless interface. After receipt, the mobile station 116 delivers the incoming first-protocol data to its recipient using the first protocol encoder/decoder, which decodes the incoming first-protocol-encoded data to uncover or otherwise expose the incoming data.

In the upstream part of the communication session after registering in the first access system 112, the mobile station 116 encodes outgoing data according to the first protocol, preferably using the first protocol encoder/decoder. Encoding the outgoing data according to the first protocol produces outgoing first-protocol data. Once encoded, mobile station 116 transmits the outgoing first-protocol data to the first access node 122 for transmission to the common gateway 120.

After traveling through the first access system 118, the outgoing first-protocol data package arrives at the common gateway 120. If necessary, the common gateway 120 encapsulates outgoing the headers of the second protocol for transmission into the common transport network 114. Preferably, the common gateway 120 simply routes the outgoing first-protocol data into the common transport network untranslated. As another option, the common gateway 120 may translate the outgoing first-protocol data using a CODEC for transport into the common transport network 114.

5. Private to Public Wireless Network Hand-off

Figure 8:
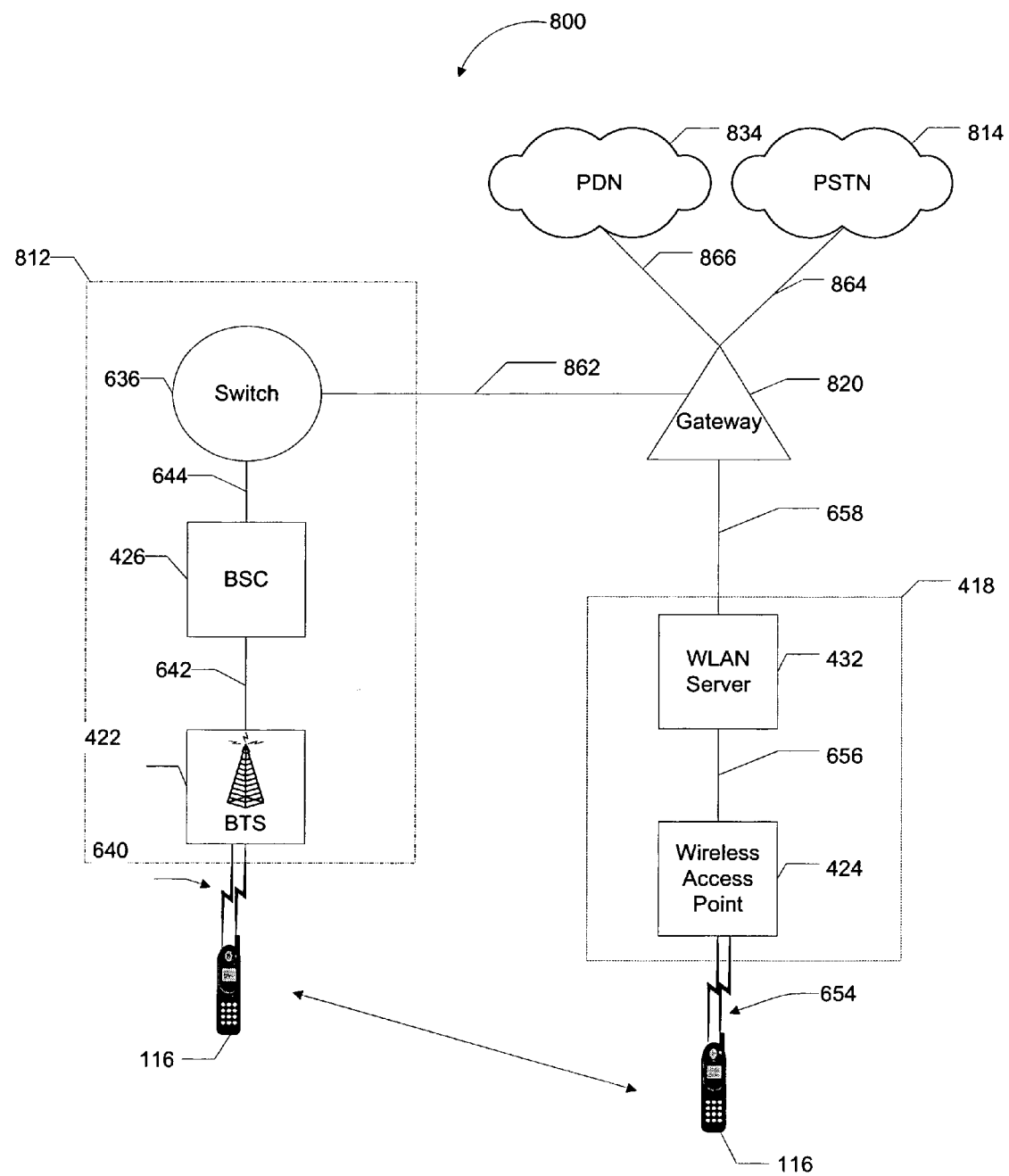
FIG. 8 is a fourth block diagram depicting an arrangement for carrying out a communication session hand-off in accordance with an exemplary embodiment.

As another example, with reference to FIG. 8, an arrangement 800 is provided to illustrate exemplary architecture for carrying out a communication session hand-off in accordance with an exemplary embodiment. The arrangement 800 shown in FIG. 8 is similar in most respects to the arrangement 600 shown in FIG. 6, except as described herein. The arrangement 800 includes a public switched telephone network (PSTN) 814, a packet data network (PDN) 834, and a private wireless network 418 that is communicatively coupled downstream to both the PSTN 814, and the PDN 834 via the gateway 820.

A. Public Wireless Network

Also included in the arrangement 800 are various elements of a public wireless network 812. Amongst the elements of the public wireless network 812 are one or more BTSs, such as BTS 422; one or more BSCs, such as BSC 426; and one or more MSCs, such as MSC 636. A gateway 820 is communicatively coupled to the one or more of the MSCs in the public wireless network 812. Preferably, the gateway 820 is communicatively coupled to MSC 636. Coupling the MSC 636 to the gateway 820 creates a seventh communication path that allows the routing of communications between the mobile station 116, and the PSTN 814 or PDN 834 via the public wireless network 812. This coupling facilitates a hand-off of communications from the private wireless network to the public wireless network. Preferably, the hand-off is a "hard hand-off" in the vernacular of IS-41.

i. Seventh Communication Path

The seventh communication path includes at least three segments, which include the first segment 640, the second segment 642, and the third segment 644. When the mobile station and the BTS 422 transmit communications over the over the first segment 640, which is wireless interface that the mobile station 116 communicates with the BTS 422, such communications are transmitted according to one or more intrasystem protocols. In an exemplary CDMA network, one of the intrasystem protocols may be EVRC. Over the second segment 642, which couples the BTS 422 and the BSC, communications are likewise transmitted according to one or more of the intrasystem protocols, which again is preferably EVRC. Between the BSC 426 and the MSC 636, communications are sent via the third segment 644 using one or more of the intrasystem and/or intersystem protocols, such as PCM (ITU G.711).

Also included in the seventh communication path is a twelfth segment 862 that couples the MSC 636 to the gateway 820. Communications switched across the twelfth segment 862 are preferably sent according to the ITU G.711 standard. Alternatively, communications switched across the twelfth segment 862 may be sent using a proprietary protocol, particularly where the gateway 820 or the gateway functions are integral to or integrated into the MSC 636 or other various public and/or private wireless network elements. In yet another arrangement, communications switched across the twelfth segment 862 may be sent according to a transport protocol, such as UDP/IP and/or TCP/IP.

In arrangement 800, the mobile station 116 is served telecommunications services by the public wireless network 812 when operating in the public wireless network's coverage area. Analogously, when registered in the private wireless network 418, mobile station 116 may be served telecommunication services from the private wireless network 418. To facilitate serving telecommunications, the private wireless network 418 is communicatively coupled to both the both the PSTN 814, and the PDN 834.

B. Private Wireless Network

Similar to the embodiment described above, the private wireless network 418 comprises various interconnected network elements that provide one or more segments of an eighth and ninth communication paths. In an IEEE 802.11 WLAN preferred embodiment of the private wireless network 418, the WLAN includes a wireless access point 424 communicatively coupled with a WLAN server 432. In turn, the WLAN server 432 is communicatively coupled to the gateway 820.

Given that the private wireless network is communicatively linked to both the PSTN 814 and PDN 834, the flow of communications to the mobile station 116 operating in the private wireless network may take different paths, e.g., the eighth and ninth communication paths. Further, the type of communication may determine the communication path a given communication takes. Moreover, the protocol used for the given communication may vary depending on which segment of the communication path the given communication is flowing.

i. Eighth and Ninth Communication Path

The eighth communication path is provided between the mobile station 116 and the PSTN 814, and is preferably provided for voice content; however, non-voice data may also be transported. Additionally, the ninth communication path is provided between the mobile station 116 and the PDN 834 for primarily non-voice data communications; however, voice content may also be transported.

The eighth and ninth communication paths both include one or more communication-path segments. Of these segments, several are common to both. The common segments include the eighth segment 654, the ninth segment 656, and the tenth segment 658. The eighth and ninth communication paths, however, diverge upstream from the gateway 820. The eighth communication path includes a thirteenth segment 864, which communicatively couples the gateway 820 with the PSTN 814. In the same way, the ninth communication path includes a fourteenth segment 866, which communicatively couples the gateway 820 with the PDN 834. These segments do not necessarily indicate physical coupling or trunking between the elements illustrated in FIG. 8, but may include other network elements connected in between.

As with the fourth and fifth communication paths, in the eighth and ninth communication paths, the mobile station 116 communicates with the wireless access point 424 over the eighth segment 654 according to the WLAN protocol. Preferably, communications transmitted across the eighth segment 654 are in accordance with the IEEE 802.11 protocol.

For communications sent across the ninth segment 656, the wireless access point 424 may translate the communications from the IEEE 802.11 protocol format into an IEEE 802.3 protocol, or other packet-data format. In the reverse direction, the WLAN server 432 may send the wireless access point 424 communications in the IEEE 802.3 protocol, which the wireless access point 424 may translate, if needed. As an alternative, if the wireless access point 424 and/or portal functions are integral to or integrated into the WLAN server 432, the eighth and ninth segments collapse into one segment over which communications preferably conform to the IEEE 802.11 protocol.

Across the tenth segment 658, which communicatively couples the WLAN server 432 to the gateway 820, communications are preferably communicated according to IEEE 802.11 protocol. Alternatively, communications may be exchanged between the gateway 820 and the WLAN server 432 using other protocols, such as UDP/IP or TCP/IP.

At the point of divergence in the eighth communication path, communications may be transported according to the PSTN 814 via the thirteenth segment 864 using the intersystem protocol, such as ITU G.711. Starting at the point of divergence again, the ninth communication path includes the fourteenth segment 866, which communicatively couples the gateway 820, and PDN 834. Communications exchanged between the gateway 820, and PDN 834 via the thirteenth segment 864 may be sent using a packet-data transport protocol, such as TCP/IP and/or UDP/IP.

The gateway 820 may provide (i) a protocol encapsulation/unencapsulation function for encapsulating and uncapsulating data of a communication (ii) an encoding function to encode and decode data of a communication, and (iii) a switching function for routing a communication to the mobile station 116. Exemplary architecture of the gateway 820, which is substantially similar to the architecture of gateway 620, includes a (i) signaling controller for signaling elements of the private and public wireless networks, (ii) a media gateway for sending and receiving communications over a packet-switched data network and a PSTN, and (iii) a media gateway controller for intermediating communications between the media gateway and the signaling controller, and for translating communications for transport between a PDN and a PSTN.

C. Functions for Accomplishing a Private to a Public Wireless Network Hand-off

Figure 9:
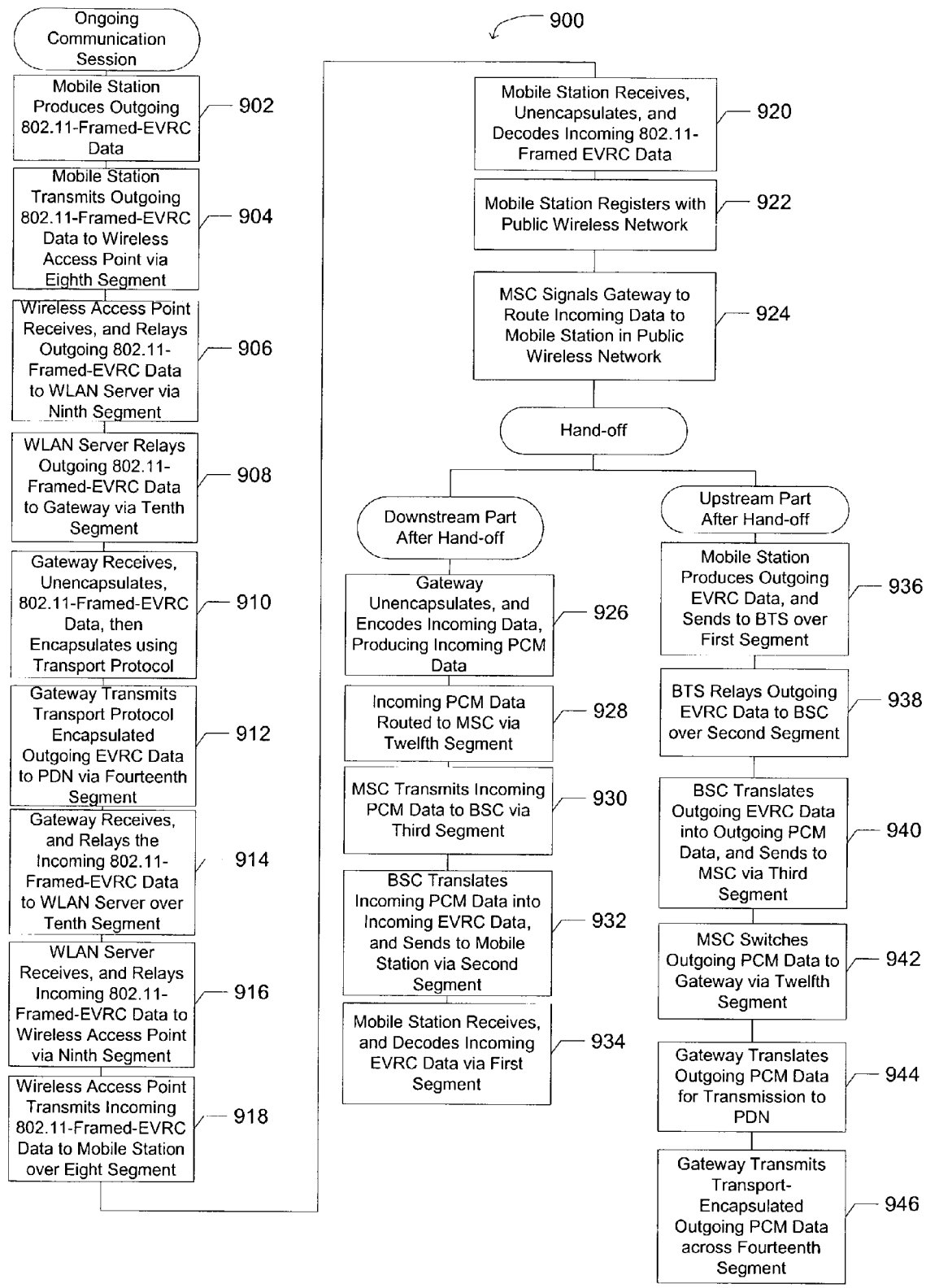
FIG. 9 is a fifth flow chart illustrating the functions used to accomplish a communication session hand-off in accordance with an exemplary embodiment.

Referring next to FIG. 9, a flow chart 900 is provided to illustrate the functions used to accomplish a communication session hand-off in accordance with an exemplary embodiment. The exemplary embodiment illustrated in FIG. 9 is described with reference to FIG. 8 in which an ongoing communication session engaged in by the mobile station 116 via the private wireless network 418 is handed-off to the mobile station 116 then operating in the public wireless network 812.

Given that there are two communication paths, namely the eighth and ninth communication path, the following describes the ongoing communication session occurring over the ninth communication path handed-off to the mobile station 116 via the seventh communication path. The differences in a hand-off of an ongoing communication session occurring over the eighth communication path to the seventh communication path occur upstream from the gateway 820, and those of average skill in the art will recognize the differences as between the mobile station 116 communicating via a PDN verses communicating via a PSTN. It should be understood that the particular order of functions as set forth and described herein can vary from that presented.

Further, as described in reference to FIG. 8, the format of the public wireless network 812 is CDMA, and the mobile station 116 communicates with the BTS 422 using EVRC standard. The format of the private wireless network complies with IEEE 802.11 WLAN protocol in which the mobile station 116 communicates with the wireless access point 424 using IEEE 802.11 protocol that includes EVRC data encapsulated in the headers of the IEEE 802.11 protocol. Moreover, the ongoing communication session comprises an upstream part that emanates from the mobile station 116, and a downstream part that emanates from the PDN 634. The upstream part includes outgoing data formatted according to the protocol of the particular segment through which the ongoing communication session is traveling. Analogously, the downstream part includes incoming data that is formatted according to the protocol of the particular segment through which the ongoing communication session is traveling.

i. Engaging in a Pre-Hand-Off Communication Session in the Private Wireless Network In the ongoing communication session, at block 902, the mobile station produces outgoing EVRC data by encoding outgoing data using the EVRC standard. The mobile station 116 uses the EVRC vocoder to create outgoing EVRC data, and then encapsulates the outgoing EVRC data in one or more 802.11 frames producing outgoing 802.11-framed-EVRC data, which is also shown in block 902. At block 904, the mobile station transmits the outgoing 802.11-framed-EVRC data to the wireless access point 424 over the eighth segment 654.

Once the outgoing 802.11-framed-EVRC data is received, the wireless access point 424 relays it across the ninth segment 656 to the WLAN server 432, as shown in block 906. Preferably, the outgoing 802.11-framed-EVRC data is relayed un-translated. The wireless access point 424, however, may further encapsulate the outgoing 802.11-framed-EVRC data in headers of the protocol used for transmission to the WLAN server 432 before relaying the outgoing 802.11-framed-EVRC data. Alternatively, the wireless access point 424 may unencapsulate the outgoing 802.11-framed-EVRC data to yield outgoing EVRC data. Then, the wireless access point 424 may encapsulate the outgoing EVRC data in another protocol, such as IEEE 802.3, for transport across the ninth segment 656.

At block 908, after receipt of the outgoing 802.11-framed-EVRC data, the WLAN server 432 may relay it over the tenth segment 658 to the gateway 820 unchanged. The WLAN server 432 unencapsulates the outgoing EVRC data from the outgoing 802.11-framed-EVRC data, and then encapsulates the outgoing EVRC data in headers of a protocol, such as UDP/IP, for transmission to the gateway 820. This may pre-empt the gateway 820 from later having to encapsulate/unencapsulate the outgoing data. The WLAN server 432 then sends the UDP/IP-encapsulated outgoing EVRC data to the gateway 820 over the tenth segment 658.

At block 910, if the gateway 820 receives the outgoing 802.11-framed-EVRC data, it may unencapsulate the outgoing EVRC data from the outgoing 802.11-framed-EVRC data, and thereafter encapsulate the outgoing EVRC data in headers of a protocol used for transmission over the fourteenth segment 866 to the PDN 834. On the other hand, if UDP/IP-encapsulated outgoing EVRC data is received, the gateway 820 may omit this encapsulation/unencapsulation function. At block 912, the gateway 820 transmits the UDP/IP-encapsulated outgoing EVRC data to the PDN 834.

In the downstream part of the communication, when receiving incoming data as incoming 802.11-framed-EVRCdata, the gateway 820 may simply relay the incoming 802.11-framed-EVRC-data to the WLAN server 432 over the tenth segment, as shown in block 914. While the preferred format is incoming 802.11-framed-EVRC-data, such format may take other forms including the format dictated by the intrasystem and intersystem protocols of the private and public wireless networks. For example, when the incoming data is received in any other format (as may be the case in MobileIP, which may use ITU standards including G.729A, G.729B, G.729AB, G.726, G.723.1, G.722, G.711), the gateway 820 may encode and encapsulate, as needed, to produce incoming 802.11-framed-EVRC-data. Details of MobileIP may be found in IP Mobility Support (RFC 2002), [online], October 1996. These details are fully incorporated herein by reference.

At block 916, when the incoming 802.11-framed-EVRC-data is received, the WLAN server 432 may relay it to the wireless access point 424 via the ninth segment 656. Next, at block 918, the wireless access point 424 transmits the incoming 802.11-framed-EVRC-data to the mobile station 116 over the eighth segment 654. At block 920, the mobile station 116 receives the incoming 802.11-framed-EVRC-data packages, and then unencapsulates the incoming EVRC data from the incoming 802.11-framed-EVRC-data packages. Further, after uncovering the incoming EVRC data, the mobile station 116, using its public wireless network EVRC vocoder, delivers decoded incoming EVRC data to the recipient.

ii. Registering in the Public Wireless Network, and Signaling for Hand-Off

During the ongoing communication session in the WLAN, at block 922, the mobile station 116 registers with the public wireless network 812. After registering, to initiate the hand-off of the ongoing communication, the public wireless network 812 may signal the gateway 820 with instructions to route incoming EVRC data, incoming PCM data, or other similarly encoded data of the ongoing communication session to the mobile station 116 via the MSC 636, as shown in block 924.

Signaling the gateway 820 may include the MSC 636 exchanging messages with the gateway 820 using a signaling system, such as IS-41 and/or IS-771. Through a series of these signaling communications, the MSC 636 requests that the gateway 820 switch or otherwise route the incoming EVRC data, incoming PCM data, or other similarly encoded data of the ongoing communication session to it.

iii. Handing-Off

At block 926, when receiving incoming data as incoming 802.11-framed-EVRC-data, the gateway 820 first unencapsulates or strips the headers (and/or frames) of the 802.11 protocol incoming 802.11-framed-EVRC-data to uncover incoming EVRC data. Unencapsulation may include a process of reassembling portions of the incoming EVRC data that were separated when framed in the 802.11 protocol. The gateway 820 then translates the incoming EVRC data into incoming PCM data, as also shown in block 926. If the gateway 820 receives incoming data in any other format, the gateway may encode/decode and unencapsulate, as needed, to create incoming PCM data. While the preferred format is incoming PCM data, such format may take other forms as dictated by the intrasystem and/or intersystem protocols used by the private and public wireless networks.

At block 928, following the MSC's 636 request to receive the incoming EVRC data from the gateway 820, the incoming EVRC data or other similarly encoded data of the ongoing communication session that would otherwise be routed to the WLAN server 432 is routed to the MSC 636.

Also at block 928, the gateway 820 then transmits the incoming PCM data to the MSC 636 via the twelfth segment 862. At block 930, the MSC 636 routes the incoming PCM data to the BSC 426 via the third segment 644. When receiving the incoming PCM data, the BSC 426 preferably translates it to incoming EVRC data, and then sends the incoming EVRC data to the BTS 422 via the second segment 642, as shown in block 932. At block 934, the mobile station 116 receives the incoming EVRC data via the first segment 640, and using its public wireless network EVRC vocoder, delivers decoded incoming EVRC data to the recipient.

In the reverse direction, the mobile station encodes the outgoing data of the communication session using its public wireless network EVRC vocoder to produce the outgoing EVRC data, and delivers the outgoing EVRC data to the BTS 422 over the first segment 640, as shown in block 936. At block 938, the BTS 422 relays the outgoing EVRC data over the second segment 642 to the BSC 426. The BSC 426 preferably translates the outgoing EVRC data into outgoing PCM data, and then sends this translated data to the MSC 636 via the third segment 644, as shown in block 940.

As if normally transmitted to another MSC in the public wireless network 812, at block 942, the MSC 636 switches the outgoing PCM data to the gateway 820 via the twelfth segment 862. Upon receipt at the gateway 820, the outgoing PCM data may be translated, converted, and or encapsulated into a protocol for transmission to the PDN 834, as shown in block 944. Then for transport to the recipient, the outgoing PCM data may be encapsulated in UDP/IP. The gateway 820 may perform other translations, conversions, encapsulations, and/or unencapsulations. At block 946, the gateway 820 relays the UDP/IP-encapsulated outgoing-PCM data across the fourteenth segment 866 to the PDN 834

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams. The claims should not be read as limited to the described order or elements unless stated to that effect. In addition, use of the term "means" "means" is not so intended. Therefore, all embodiments that come within the scope and spirit of the following claims and equivalents thereto are claimed as the invention.

Preferred and alternative embodiments of the present invention have been illustrated and described. It will be understood, however, that changes and modifications may be made to the invention without deviating from its true spirit and scope, as defined by the following claims.

What is claimed is:

1. A method of handing off a communication session with a mobile station when the mobile station is engaging in the communication session via a first access system and then registers in a second access system, wherein the first access system and second access system both provide access to a common transport network, wherein the first access system includes a first access node, wherein the second access system includes a second access node, wherein when the mobile station is in the first access system the mobile station communicates with a first access node according to a first protocol, and wherein when the mobile station is in the second access system the mobile station communicates with a second access node according to a second protocol different than the first protocol, the method comprising:

after registration of the mobile station in the second access system, the mobile station encoding outgoing data of the communication session according to the first protocol so as to produce outgoing first-protocol-encoded data the mobile station encapsulating the outgoing first-protocol-encoded data in headers of the second protocol so as to produce outgoing second-protocol-encapsulated first-protocol-encoded data;

the mobile station sending the outgoing second-protocol-encapsulated first-protocol-encoded data to the second access node;

the mobile station receiving incoming second-protocol-encapsulated first-protocol-encoded data from the second access node; and the mobile station stripping headers of the second protocol from the incoming second-protocol-encapsulated first-protocol-encoded data so as to uncover incoming first-protocol-encoded data.

2. The method of claim 1, wherein the second protocol is IEEE 802.11 protocol (802.11), wherein the first protocol is Enhanced Variable Rate Coder standard (EVRC), and wherein the second-protocol-encapsulated first-protocol-encoded data comprises 802.11-encapsulated EVRC data.

3. The method of claim 1, wherein the second protocol is a protocol selected from the group consisting of IEEE 802.11, TCP/IP, UDP/IP, ITU H.323, SIP, FRAME RELAY, and IEEE 802.3.

4. The method of claim 1, wherein the first protocol is a protocol selected from the group consisting of EVRC, PCM, ADPCM, CELP, ACELP, RCELP, SMV, LPC, STC, IMBE, CDMA QCELP, CDMA4000-SMV, AMR-GSM, Federal Standard 1017, IS-54, and IS-641.

5. The method of claim 1, wherein the first access node and second access node are both communicatively linked with a common gateway to the common transport network, the method further comprising:

after registration of the mobile station in the second access system, instructing the common gateway to route incoming fist-protocol-encoded data of the communication session to the second access system, for transmission in turn to the mobile station-S.

6. The method of claim 5, further comprising, in the communication session:

the common gateway receiving the incoming first-protocol-encoded data destined for the mobile station;

the common gateway encapsulating the incoming first-protocol-encoded data in headers of the second protocol so as to produce incoming second-protocol-encapsulated first-protocol-encoded data; and the common gateway sending the incoming second-protocol-encapsulated first-protocol-encoded data to the second access system for transmission in turn to the mobile station.

7. The method of claim 5, further comprising, in the communication session:

the mobile station sending outgoing second-protocol-encapsulated first-protocol-encoded data via the second access system to the common gateway;

the common gateway stripping headers of the second protocol from the outgoing second-protocol-encapsulated first-protocol-encoded data so as to uncover outgoing first-protocol-encoded data; and the common gateway sending the outgoing first-protocol-encoded data into the common transport network.

8. The method of claim 6, wherein the first protocol is a protocol selected from the group consisting of EVRC, PCM, ADPCM, CELP, ACELP, RCELP, SMV, LPC, STC, IMBE, CDMA, QCELP, CDMA4000-SMV, AMR-GSM, Federal Standard 1017, IS-54, and IS-641.

9. The method of claim 6, wherein the second protocol is a protocol selected from the group consisting of IEEE 802.11, TCP/IP, UDP/IP, ITU H.323, SIP, FRAME RELAY, and IEEE 802.3.

10. A method of handing off a communication session with a mobile station when the mobile station is engaging in the communication session via a first access system and then registers in a second access system, wherein the first access system provides access to a transport network for both the first access system and the second access system, wherein the first access system includes a first access node, wherein the first access node is communicatively linked to a switch that in turn is communicatively linked to the transport network, wherein the second access system includes a second access node, wherein when the mobile station is in the first access system the mobile station communicates with a first access node according to a first protocol, and wherein when the mobile station is in the second access system the mobile station communicates with a second access node according to a second protocol different than the first protocol, the method comprising:

after registration of the mobile station in the second access system, carrying the communication session between the mobile station and the second access node according to the second protocol over the first protocol;

instructing the switch to route incoming data of the communication session to the second access system, for transmission in turn to the mobile station, wherein the incoming data of the communication session passes from the first access system to the second access system through a gateway, wherein the second access node is communicatively linked with the gateway and wherein the gateway is communicatively linked to the switch;

the switch sending the incoming data destined for the mobile station to the gateway;

the gateway receiving the incoming data destined for the mobile station:

the gateway encoding the incoming data according to the first protocol so as to produce incoming first-protocol-encoded data;

the gateway encapsulating the incoming first-protocol-encoded data in headers of the second protocol so as to produce incoming second-protocol-encapsulated first-protocol-encoded data; and the gateway sending the incoming second-protocol-encapsulated first-protocol-encoded data to the second access system for transmission in turn to the mobile station.

11. The method of claim 10, wherein instructing the switch to route incoming data of the communication session to the second access system, for transmission in turn to the mobile station comprises:

sending a signaling message to the switch instructing the switch to route incoming data of the communication session to the gateway, wherein upon receiving the incoming data the switch routes the incoming data to the second access system, for transmission in turn to the mobile station.

12. The method of claim 10, wherein outgoing data of the communication session passes to the first access system from the second access system through the gateway, the method further comprising, in the communication session:

the mobile station sending outgoing second-protocol-encapsulated first-protocol-encoded data via the second access system to the gateway;

the gateway stripping headers of the second protocol from the outgoing second-protocol-encapsulated first-protocol-encoded data so as to uncover outgoing first-protocol-encoded data;

the gateway decoding the outgoing first-protocol-encoded data so as to produce outgoing data; and the gateway sending the outgoing data to the switch for transmission to the transport network.

13. The method of claim 10, further comprising:

after registration of the mobile station in the second access system, instructing the switch to route incoming first-protocol-encoded data of the communication session to the second access system, for transmission in turn to the mobile station.

14. The method of claim 13, wherein the incoming first-protocol-encoded data of the communication session passes from the first access system to the second access system through the gateway, and wherein instructing the switch to route incoming first-protocol-encoded data of the communication session to the second access system, for transmission in turn to the mobile station comprises:

sending a signaling message to the switch in the first access system instructing the switch to route incoming first-protocol-encoded data of the communication session to the gateway, wherein upon receiving the incoming first-protocol-encoded data the switch routes the incoming data to the second access system, for transmission in turn to the mobile station.

15. The method of claim 13, wherein the incoming first-protocol-encoded data of the communication session passes from the first access system to the second access system through the gateway, the method further comprising, in the communication session:

the gateway receiving incoming first-protocol-encoded data destined for the mobile station;

the gateway encapsulating the incoming first-protocol-encoded data in headers of the second protocol so as to produce incoming second-protocol-encapsulated first-protocol-encoded data; and the gateway sending the incoming second-protocol-encapsulated first-protocol-encoded data to the second access system for transmission in turn to the mobile station.

16. The method of claim 13, wherein outgoing data of the communication session passes to the first access system from the second access system through the gateway, the method further comprising, in the communication session:

the mobile station sending outgoing second-protocol-encapsulated first-protocol-encoded data via the second access system to the gateway;

the gateway stripping headers of the second protocol from the outgoing second-protocol-encapsulated first-protocol-encoded data so as to uncover outgoing first-protocol-encoded data; and the gateway sending the outgoing first-protocol-encoded data to the switch for transmission to the transport network.

17. A method of handing off a communication session to a mobile station via a first access system when the mobile station is engaging in the communication session via a second access system and then registers in the first access system, wherein the first access system and second access system both provide access to a common transport network, wherein the first access system includes a first access node, wherein the second access system includes a second access node, wherein the first access node and second access node are both communicatively linked with a common gateway to the common transport network, wherein when the mobile station is in the first access system the mobile station communicates with a first access node according to a first protocol, wherein when the mobile station is in the second access system, the mobile station communicates with a second access node according to the second protocol over a first protocol, and wherein the first protocol is different than the second protocol, the method comprising:

after registration of the mobile station in the first access system, carrying the communication session between the mobile station and the first access node according to the first protocol;

instructing the common gateway to route incoming first-protocol-encoded data of the communication session to the first access system for transmission in turn to the mobile station;

the common gateway receiving incoming second-protocol-encapsulated first-protocol-encoded data destined for the mobile station;

the common gateway stripping headers of the second protocol from the incoming second-protocol-encapsulated first-protocol-encoded data so as to uncover first-protocol-encoded data; and the common gateway sending the incoming first-protocol-encoded data to the first access system for transmission in turn to the mobile station.

18. The method of claim 17, wherein carrying the communication session between the mobile station and the first access node according to the first protocol comprises:

the mobile station encoding outgoing data of the communication session according to the first protocol so as to produce outgoing first-protocol-encoded data;

the mobile station sending the outgoing first-protocol-encoded data to the first access node;

the first access node relaying the outgoing first-protocol-encoded data via the first access system to the common gateway;

the common gateway encapsulating the outgoing first-protocol-encoded data in headers of the second-protocol so as to produce outgoing second-protocol-encapsulated first-protocol-encoded data; and the common gateway sending the outgoing second-protocol-encapsulated first-protocol-encoded data into the common transport network.

19. A method of handing off a communication session to a mobile station via a first access system when the mobile station is engaging in the communication session via a second access system and then registers in the first access system, wherein the first access system provides access to a transport network for both the first access system and the second access system, wherein the first access system includes a first access node, wherein the second access system includes a second access node, wherein when the mobile station is in the first access system the mobile station communicates with a first access node according to a first protocol, wherein when the mobile station is in the second access system the mobile station communicates with a second access node according to the second protocol over the first protocol, and wherein the first protocol is different protocol that the second protocol, the method comprising:

after registration of the mobile station in the first access system, carrying the communication session between the mobile station and the first access node according to the first protocol, wherein incoming second-protocol encapsulated first-protocol encoded data of the communication session passes from the second access system to the first access system through a gateway;

instructing the gateway to strip headers of the second-protocol from the incoming second-protocol encapsulated first-protocol-encoded data of the communication session so as to uncover incoming first-protocol-encoded data; and the gateway routing the incoming first-protocol-encoded data to the first access system, for transmission in turn to the mobile station.

20. The method of claim 19, wherein the second access node is communicatively linked with a switch that in turn is communicatively linked to the gateway, and wherein the gateway routing the incoming first-protocol-encoded data to the second access system, for transmission in turn to the mobile station comprises:

sending a signaling message to the gateway instructing the gateway to route incoming first-protocol-encoded data of the communication session to the switch, wherein upon receiving the incoming first-protocol-encoded data the switch routes the incoming first-protocol-encoded data to the first access node, for transmission in turn to the mobile station.

21. The method of claim 19, wherein the first access node is communicatively linked with a switch that in turn is communicatively linked to the gateway, and wherein outgoing first-protocol-encoded data of the communication session passes from the first access system to the gateway via the switch, the method further comprising, in the communication session:

the gateway receiving from first access system the outgoing first-protocol-encoded data destined for the transport network;

the gateway encapsulating the outgoing first-protocol-encoded data in headers of the second protocol so as to produce outgoing second-protocol-encapsulated first-protocol-encoded data; and the gateway sending the outgoing second-protocol-encapsulated first-protocol-encoded data to the transport network.

* * * * *